United States Patent [19]

Gulick et al.

[11] Patent Number: 5,555,287

[45] Date of Patent: Sep. 10, 1996

[54] INTEGRATED CIRCUIT AND CORDLESS TELEPHONE USING THE INTEGRATED CIRCUIT

[75] Inventors: Dale E. Gulick; Joseph W. Peterson; James E. Bowles; John G. Bartkowiak, all of Austin, Tex.; Munehiro Yoshikawa, Tokyo, Japan; Shin Saito, Tokyo, Japan; Hiroshi Matsubara, Tokyo, Japan

[73] Assignee: Advanced Micro Devices, Inc., Sunnyvale, Calif.

[21] Appl. No.: 918,627

[22] Filed: Jul. 21, 1992

[51] Int. Cl.$^6$ .................................................. H04Q 7/32
[52] U.S. Cl. ............................................ 379/61; 379/58
[58] Field of Search ................................ 379/58, 59, 61, 379/201, 418; 455/343, 38.3, 33.1, 54.1, 127, 89; 395/750; 381/30

[56] References Cited

U.S. PATENT DOCUMENTS

| | | | |
|---|---|---|---|
| 4,550,425 | 10/1985 | Andersen et al. | 381/30 |
| 4,928,306 | 5/1990 | Biswas et al. | 379/201 |
| 4,965,820 | 10/1990 | Sharpe et al. | 379/59 |
| 4,979,205 | 12/1990 | Haraguchi et al. | 379/61 |
| 5,163,153 | 11/1992 | Cole et al. | 395/750 |
| 5,204,986 | 4/1993 | Ito et al. | 455/343 |
| 5,251,325 | 10/1993 | Davis et al. | 455/38.3 |
| 5,297,203 | 3/1994 | Rose et al. | 379/61 |
| 5,384,807 | 1/1995 | Yatim et al. | 379/418 |

FOREIGN PATENT DOCUMENTS 0465054  6/1991  European Pat. Off. .

OTHER PUBLICATIONS

Nishino Et Al., *ISDN Telephone Sets With Advanced Voice Functions*, IEEE Transactions on Consumer Electronics, vol. 37, No. 3, Aug. 1991, pp. 560–565.

Hart, Et Al., *A Low–Cost Approach To Cellular Mobile Telephones*, IEEE Transactions on Consumer Electronics, vol. 37, No. 1, Feb. 1991, pp. 32–38.

John Gosch, *Software–Programmable DSP Chip Takes On Communication Jobs*, Electronic Design, vol. 39, Sep. 26, 1991, pp. 155–156, 159.

*Primary Examiner*—Curtis Kuntz
*Assistant Examiner*—William G. Trost
*Attorney, Agent, or Firm*—Jenkens & Gilchrist, P.C.

[57] ABSTRACT

An integrated circuit especially suitable for incorporation into the base and handset units of a cordless telephone integrates the speech, control channels, and microcontroller portions of a modem, and the man-machine interface functions of a cordless telephone. The integrated circuit includes one or more of a number of aspects including an in-circuit emulation mechanism, a simplified keypad reporting mechanism, advanced noise suppression mechanisms, a low power emergency mode mechanism, a low cost serial control bus, a port pin interrupt mechanism, advanced power saving mechanisms, spectral measurement test mode means, a novel shut down mechanism, and a pull-up disabling mechanism.

17 Claims, 15 Drawing Sheets

INTEGRATED CIRCUIT AND CORDLESS TELEPHONE USING THE INTEGRATED CIRCUIT

CROSS-REFERENCE TO RELATED APPLICATIONS

This application is related to the following U.S. patent applications:

| Ser. No. | TITLE | INVENTOR(S) |
| --- | --- | --- |
| 07/917,497 | General I/O Port Interrupt Mechanism | Gulick, et al. |
| 07/917,489 | Improved External Memory Access Control for a Processing Unit | Gulick, et al. |
| 07/917,488 | Method of Weak Pull-up Disable and Mechanism Therefor for Use with Microcontroller in Integrated Circuit and Cordless Telephone Using the Integrated Circuit | Bowles, et al. |
| 07/917,503 | Interrupt Mask Disable Circuit and Method | Bowles, et al. |
| 07/918,626 | Modulator Test System | Peterson, et al. |
| 07/918,625 | Keypad Scanner Process and Device and Cordless Telephone Employing the Mechanism | Gulick |
| 07/918,624 | Serial Interface Module and Method | Gulick, et al. |
| 07/918,631 | Low Power Emergency Telephone Mode | Peterson, et al. |
| 07/918,632 | In-Circuit Emulation Capability Mode in Integrated Circuit and Cordless Telephone Using the Integrated Circuit | Gulick, et al. |
| 07/918,622 | Clock Generator Capable of Shut-down Mode and Clock Generation Method | Peterson, et al. |
| 07/918,621 | Signal Averager | Gulick |

All of the related applications are filed on even date herewith, are assigned to the assignee of the present invention, and are hereby incorporated herein in their entirety by this reference thereto.

BACKGROUND OF THE INVENTION

Field of the Invention

The present invention relates to integrated circuits (IC's) and, more particularly, to IC's involved with the speech, control channel, or microcontroller portions of a modem, or with the man-machine interface functions of a cordless telephone.

DESCRIPTION OF RELATED ART

The standard telephone consists of a base unit and a handset unit connected to each other by an electrical cord. The base unit itself is connected by another cord to a receptacle on a wall, telephone pole or a similar immovable structure to which the telephone network line extends. Because of this connection to an immovable structure, the range of movement of the operator of the telephone is quite limited. Even when the cords connecting the handset unit to the base unit and the base unit to the wall are long, it can be cumbersome either to move the entire telephone around to make calls from different locations or to walk around with the handset unit once a call has been placed. The simple fact that there is always a continuous physical connection between the person making the phone call and the immovable wall or other fixed structure can be a great inconvenience.

The cordless telephone represents a significant improvement over the standard telephone. In the conventional cordless telephone, the base unit is still connected to the receptacle on the immovable wall or the like by a cord so that message signals from the telephone network line may be received and transmitted. However, the handset unit of the cordless telephone is an independently operative unit from which calls may be made and by which calls may be received with no physical connection to the base unit. The handset unit has a transmitting/receiving system or transceiver, a loudspeaker in an earpiece and a microphone in a mouthpiece. The base unit and the handset unit of the cordless telephone communicate with each other over a communication channel established by the transmission and reception of electromagnetic waves, conventionally radio waves. The handset unit may then be taken considerable distances from the base unit while still making and receiving telephone calls. Since there is no telephone cord extending between the handset unit and the base unit, the operator is free to move about without hindrance.

Heretofore, integrated circuits have been developed and used in cordless telephones to perform various functions. For example, U.S. Pat. No. 5,005,150 to Dent et al. discloses a digital signal processor incorporated in an integrated circuit to convert pulse code modulated (PCM) signals to adaptive differential pulse code modulation (ADPCM) signals in cordless telephones. As pointed out in that patent, however, cordless telephone IC development has been hampered because of power consumption considerations. Cordless telephones have to be battery-powered if they are to be mobile and heretofore conventional microprocessors or microcomputers have been considered to consume too much energy to be used, in a practical manner, in mass-produced cordless telephones. Additionally, conventional microprocessors or microcomputers have been considered to be too expensive for such applications.

Notwithstanding the problems associated with developing IC's for cordless telephones, there are a number of aspects of such phones that can be improved by intelligent use of IC's. Examples of these aspects include having an IC that supports an in-circuit emulation mode, having a keypad reporting mechanism with reduced software overhead and simplified hardware, having advanced noise suppression mechanisms, having a low power emergency mode, and having a low cost serial control bus. Other examples of such aspects include having a generally useful interrupt mechanism added to port pins, having advanced power saving mechanisms, having test mode means to simplify spectral measurements, having a shut down mode to extend idle time operability, and having a pull-up disabling mechanism to avoid unnecessary power consumption during input mode. Each of these examples are discussed in individual paragraphs immediately below.

With regard to the first example mentioned above, having an IC that supports an in-circuit emulation mode, such an aspect facilitates development of software to run on the IC. As is known to those skilled in the art, in-circuit emulators literally replace microcontrollers with hardware to allow software developers to develop and debug their software. This replacement is easily effected when a microcontroller is kept separate from the rest of the system, that is, when it is not incorporated into an IC. The replacement is not easily effected when a microcontroller is incorporated into an IC. Providing an IC with an in-circuit emulation mode is a way to facilitate replacement in the latter case.

The second example mentioned above, relating to keypad reporting, arises because of economics and the universality of keypads. It is desirable to have reduced costs of hardware associated with keypads; likewise, it is desirable to be able to monitor keyboards with a minimal amount of software. Reduced hardware and minimal software reduces processor costs and required clock speeds.

As is well known to those skilled in the art, when digital information is sent via radio bit error rates tend to be bad. It is not uncommon for there to be 32 errors per second dealing with typical speech in a conventional working system. These errors can cause loud, distracting pops and cracks. Because of the noise problem, and because errors cannot yet be wholly eliminated, those skilled in the art recognize noise suppression to be an area in which improvements can and should continually be made.

The next example mentioned above, having a low power emergency mode, is useful because AC wall power can occasionally be interrupted cutting off power to the cordless telephone base station. In such circumstances it is still desired for an operator to be able to place a call using the handset associated with the base station. Power needs to be provided to a number of telephone systems, but at reduced level, otherwise power necessary to place telephone calls will rapidly dissipate.

Having a low cost serial control bus is important because of the universality of serial interfaces to industry standard external devices and the lack heretofore of an extremely simple, flexible, and low cost serial control bus.

The next example mentioned above, having a generally useful interrupt mechanism added to port pins, arises because of the incorporation of a microcontroller into an IC. When a microcontroller is incorporated into an IC, interrupts must be sent to it. Heretofore, those skilled in the art have lacked knowledge of structure that can be added to a microcontroller/IC to cause port pins that have been defined as inputs to generate interrupts to the microcontroller.

As previously mentioned, the fact that cordless telephone handsets are battery powered requires judicious use of power. Heretofore, those skilled in the art have made a number of developments to save power in microcontroller/microprocessor based systems. However, it is critical that cordless telephones employ the most advanced power saving mechanisms. Many memory accesses are made in cordless telephone applications. It is a shortcoming and deficiency of the prior art that power consumption has not yet been minimized for such accesses.

Having test mode means to simplify spectral measurements is desirable to enable or to facilitate testing of a finally produced cordless telephone.

As those skilled in the art are well aware, it is desirable for cordless telephone idle time, that is, the period of time between uses, to be as long as possible before the battery or batteries run down. Heretofore, there has been a need for a simply implemented way to effect an extension of idle time, without having an adverse impact on any other cordless telephone functional areas.

The last example mentioned above, having a pull-up disabling mechanism to avoid unnecessary power consumption during input mode, relates to the quasi-bidirectional buffers on an Advanced Micro Devices 80C51 or derivative product. As those skilled in the art are aware, those buffers are designed with a weak pull-up on the port 3, 2 and 1 output buffers. This has caused power consumption increases that ideally could be eliminated.

Based upon all of the foregoing, those skilled in the art should now perceive that there are a multitude of aspects of cordless telephones that can be improved. It is a shortcoming and deficiency of the prior art that a solution to each and every one of the problems addressed above has not yet been conceived.

SUMMARY OF THE INVENTION

To overcome the aforementioned shortcomings and deficiencies, the present invention provides an integrated circuit especially designed to be installed in both the base unit and handset unit of a cordless telephone. In general, the present invention provides a single IC that integrates the speech, control channels, and microcontroller portions of a modem, and the man-machine interface functions of a cordless telephone. More specifically, IC's according to the present invention include one or more of a number of aspects including an in-circuit emulation mechanism, a simplified keypad reporting mechanism, advanced noise suppression mechanisms, a low power emergency mode mechanism, a low cost serial control bus, a port pin interrupt mechanism, advanced power saving mechanisms, spectral measurement test mode means, a novel shut down mechanism, and a pull-up disabling mechanism.

Accordingly, it is an object of the present invention to provide an IC that can inexpensively provide advanced functions to cordless telephones.

Another object of the present invention is to provide an IC that can be used in both the base unit and handset unit of a cordless telephone.

Yet another object of the present invention is to provide an IC with low power consumption requirements.

Still yet another object of the present invention is to provide an IC into which a microcontroller is well incorporated.

Yet a further object of the present invention is to provide a cordless telephone with low power consumption requirements.

BRIEF DESCRIPTION OF THE DRAWINGS

For a more complete understanding of the present invention, and for further objects and advantages thereof, reference may now be had to the following detailed description taken in conjunction with the accompanying drawings wherein.

DETAILED DESCRIPTION OF THE INVENTION

The present invention, in its IC form, was the result of a project to build a single IC that integrates the speech, control channel, and microcontroller portions of a modem, and the man-machine interface functions of a cordless telephone. The goal of the project was to build an IC especially suitable for use in a cordless telephone.

In the detailed description that follows, to facilitate understanding of use of an embodiment of the present invention, and as an example only, an embodiment of the present invention which is incorporated into a cordless telephone system is precisely described. It should be expressly understood that embodiments of the present invention are not necessarily limited to that application, although such embodiments have been found to work especially well in actual practice when so used. Further, it should also be expressly understood that a multitude of different embodiments of the present invention could be employed in the particular application described; as is typical and understood, the present invention is limited solely by the scope of the appended claims.

Architectural Issues with Respect to the Cordless Telephone Application

Figure 1:
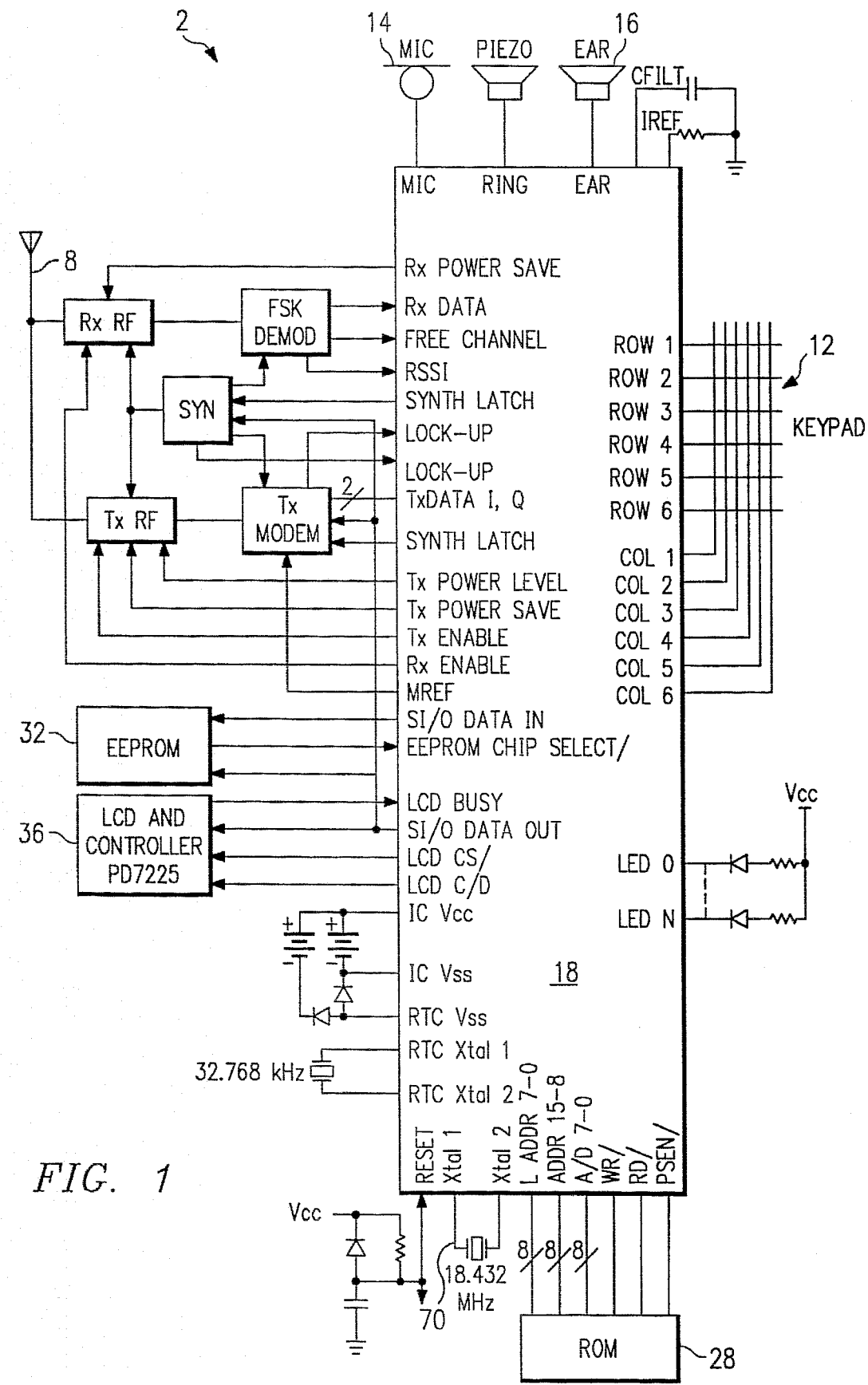
FIG. 1 is a block diagram of a handset unit of a cordless telephone into which an IC according to the teachings of the present invention has been installed.
Figure 2:
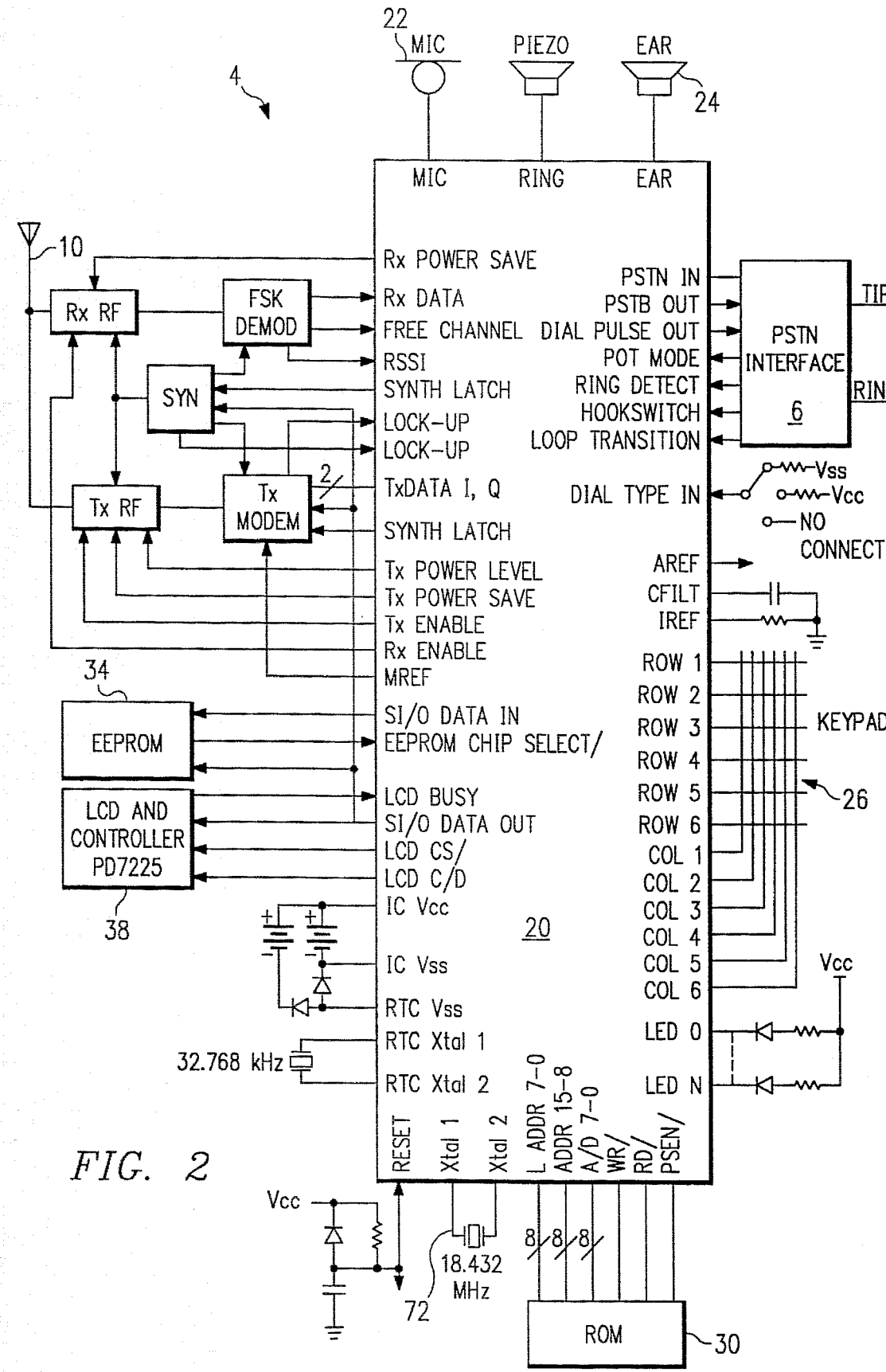
FIG. 2 is a block diagram of a base unit of a cordless telephone into which an IC according to the teachings of the present invention has been installed.

Referring now to the drawings wherein for convenience and clarity like or similar elements are generally referred to with the same reference numeral throughout the several views, and initially to FIGS. 1 and 2, shown therein is a cordless telephone of a type into which IC's according to the teachings of the present invention may be incorporated. Such a cordless telephone includes a handset or terminal unit 2 (shown in FIG. 1) and a base unit or base station 4 (shown in FIG. 2). Base unit 4 is connected by a telephone cord to an outlet or receptacle in a wall, a telephone pole, or another fixed structure, so that it may both receive and transmit telephone message signals through a telephone network line 6 and so that it also may be powered thereby. An antenna 8 on the handset 2, and a corresponding antenna 10 on the base station 4 are used to create a communication channel between the two units by the transmission and reception of radio waves. As is conventional, handset unit 2 includes a keypad 12 for making or dialing outgoing calls, and a mouthpiece and an earpiece, with which a microphone 14 and a loudspeaker 16 are, respectively, associated. A telephone number may be entered on the keypad 12, and corresponding information is transmitted over the communication channel to base unit 4, and thence to the telephone network line 6. Alternatively, when base unit 4 receives a message signal from the telephone network line 6 indicating that an incoming call is present, a signal from base unit 4 causes a ringing sound in handset unit 2 and a second ringing sound in base unit 4 to indicate the existence of the incoming call.

The standard maximum separation of such a handset unit 2 and base unit 4, which is called the service area, is about 300 meters, and is set by the Federal Communications Commission (FCC). Typically, there are ten duplex channels permitted for each system with the upper channel having a frequency in the 49 MHz band and the lower channel having a frequency in the 46 MHz band. Of course, such operating parameters are set by the FCC and do not form a part of the present invention.

As may be seen in FIGS. 1 and 2, an IC according to the teachings of the present invention is used in both the handset unit 2 and the base station 4. The IC is designated by reference numeral 18 in FIG. 1 and by reference numeral 20 in FIG. 2.

It should be recognized that normal telephone practices and conventional telephone equipment mechanisms are not readily applicable to the cordless telephone area. For example, it is common in standard telephone development practice to implement features in a switch instead of in a telephone in order to reduce the cost of the telephone. In a cordless telephone, on the other hand, the consumer must buy both the base station and the handset. Thus, the cost of the handset cannot effectively be reduced at the expense of the base station; the cost of both must be minimized.

Referring again to FIGS. 1 and 2, it may be seen that the base station 4, like the handset 2, comprises a microphone 22, an ear piece 24, and a keypad 26. Likewise, both the handset 2 and the base station 4 include a ROM 28, 30, an EPROM 32, 34, an LCD and controller 36, 38, as well as a number of other elements which generally relate to the radio signals and power levels.

The IC Itself

Referring now to FIG. 3, there is shown a block diagram of an IC according to the teachings of the present invention. Pertinent elements of this IC will be discussed hereinbelow.

Operating Modes

Generally describing the IC shown in FIG. 3, it may be noted initially that the IC has three basic modes of operation. Those three modes are an in-circuit emulation mode, a normal mode, and a test mode. The in-circuit emulation mode capability is an important aspect of the present invention which will be described in greater detail below. At this point, however, it may be noted that the in-circuit emulation mode disables the on-chip microcontroller (designated by reference numeral 40 in FIG. 3), allowing an external in-circuit emulator to be used for software development. The normal mode is the mode in which the product containing the IC is operated by the end user. As discussed further below, the normal mode is further subdivided into an active mode and a shut-down mode. The final mode of operation, the test mode, is basically the same as the normal mode, except that in the test mode it is possible to also enable internal test functions of the IC.

Entry into the three operating modes is controlled by the state of the reset pin 42 and the tri-level IN1 (TRI1) pin 44. Although those pins 42, 44 could effect such selection in a number of different ways, one way would be to have the state of the TRI1 pin be monitored and acted upon by the IC when the reset pin 42 goes inactive. If the TRI1 is low, for example, the in-circuit emulation mode could be activated. At a mid supply or no-connect point, the test mode could be activated. Finally, when the TRI1 pin is high and, again, when the reset pin 42 goes inactive, the IC could operate in the normal mode.

Thus, it should be understood that an IC according to the teachings of the present invention may support an in-circuit emulation mode that disables the on-chip microcontroller 40 allowing an external emulator to function in its place. In such a case, all internal signals that connect to the microcontroller must work with the timing delays inherent in having the microcontroller or emulator off chip. In an actually constructed embodiment of the present invention, the emulation mode is entered at reset if, when the reset pin 42 goes high, the tri-level input 1 pin 44 is low. All internal connections to I/O ports are routed off chip with the exception of the clock connected to the time 0 and time 1 inputs (and it should be noted that this clock can be built externally). ALE and PSEN/ become inputs. The clock input to the microcontroller, which is routed off chip, is forced on at reset in emulation mode. The watchdog timer (element 46 in FIG. 3) does not operate in the in-circuit emulation mode.

When the IC shown in FIG. 3 (which IC, it should be noted, depicts the actually constructed embodiment of the present invention mentioned above) is placed in the in-circuit emulation mode, a number of pins shown in FIG. 3 change function. Specifically, in the in-circuit emulation mode, pin 48 shown in FIG. 3 functions as an INT0/OUT, pin 50 functions as an INT1/OUT, pin 52 functions as a CPUCLKOUT, pin 54 functions as an ALE input, pin 56 functions as an RD/input, pin 58 functions as a WR/input, pin 60 functions as an ADDR15-8 inputs, pin 62 functions as an ADDR/DATA7-1–addresses=inputs data I/O=O/I, pin 64 functions as high-Z, pin 66 functions as input, and pin 68 functions as high-Z.

With regard to normal operating modes of the IC shown in FIG. 3, as previously mentioned, there are two power modes, shut-down and active. In the shut-down mode, the 18.432 MHz oscillators (see element 70 in FIG. 1 and element 72 in FIG. 2) and all clocks derived from those oscillators are stopped. All modules are disabled with the exception of the real time clock (which is shown as element 74 in FIG. 3). All analog pins are placed in their OFF state as though the IC was being reset. The real time clock 74 is not affected by the shut-down mode. In the actually constructed embodiment of the present invention, the watchdog timer 46 is disabled in the shut-down mode.

Continuing to des tribe the actually constructed embodiment of the present invention depicted in FIG. 3, entry into the shut-down mode is under software control. Entry into the shut-down mode is protected by an access control mechanism to avoid placing the IC in shut-down inadvertently. After being programmed in the shut-down mode, the microcontroller's clock runs for between 3.56 and 7.2 milliseconds before being stopped. This allows the microcontroller to be programmed to its idle state.

Wake up from the shut-down mode comes from reset, an any-key-down indication from the keypad scanner, or any non-mask interrupt. All of these conditions cause an interrupt request to be generated. In response to a request to wake-up, the 18.432 MHz oscillator is turned on. Once it becomes stable, the microcontroller clock is turned on at its previously programmed frequency. Once the microcontroller clock is stable, the interrupt request is generated to the microcontroller. This interrupt causes the microcontroller to leave its idle state.

With regard to the active mode, in the active mode the oscillator is running. Each module in the IC can be programmably turned on or off via a register.

User Visible Registers

Because of the level of sophistication of those skilled in the art and the degree of detail shown in FIGS. 1–3, no attempt will be made herein to precisely describe the functions of each pin and register within the IC shown. Such description is simply not necessary for those skilled in the relevant art to obtain a full understanding of all of the inventive aspects of the present invention. However, for the convenience of those skilled in the art, and to facilitate further discussion hereinbelow, it may be useful at this point to identify the various user accessible registers within the IC shown in FIG. 3. These user visible or accessible registers include an address decoder 76, an audio interface 78, a battery level detector 80, a clock generator 82, a codec with an associated ADPCM 84, an interrupt controller 86, a keypad scanner 88, FIFOs 90, the real time clock 74, an RSSI-A/D converter 92, a serial port 94, a logic module 96, a tone ringer 98, a transmitter modem 100, and a reset associated with the watchdog timer 102.

Audio Path—General

At this point it is appropriate to describe the audio path of an IC according to the teachings of the present invention. The audio path in the actually constructed embodiment of the present invention is comprised of the audio interface 78, the codec and associated ADPCM 84, a dual-tone generator (see FIG. 5), and the tone ringer 98. The codec, ADPCM, and dual-tone generator functions are implemented with the same digital signal processing (DSP) engine.

Audio Path—Audio Interface

Generally, the audio interface 78 connects the analog side of the codec 84 and the tone ringer 98 to the off chip microphone (e.g., element 22 in FIG. 2), ear piece (e.g., element 24 in FIG. 2), speaker (e.g., element 24 in FIG. 2), PSTN (e.g., element 6 in FIG. 2), and so on. Software controls the signal routing and amplitudes.

Figure 4:
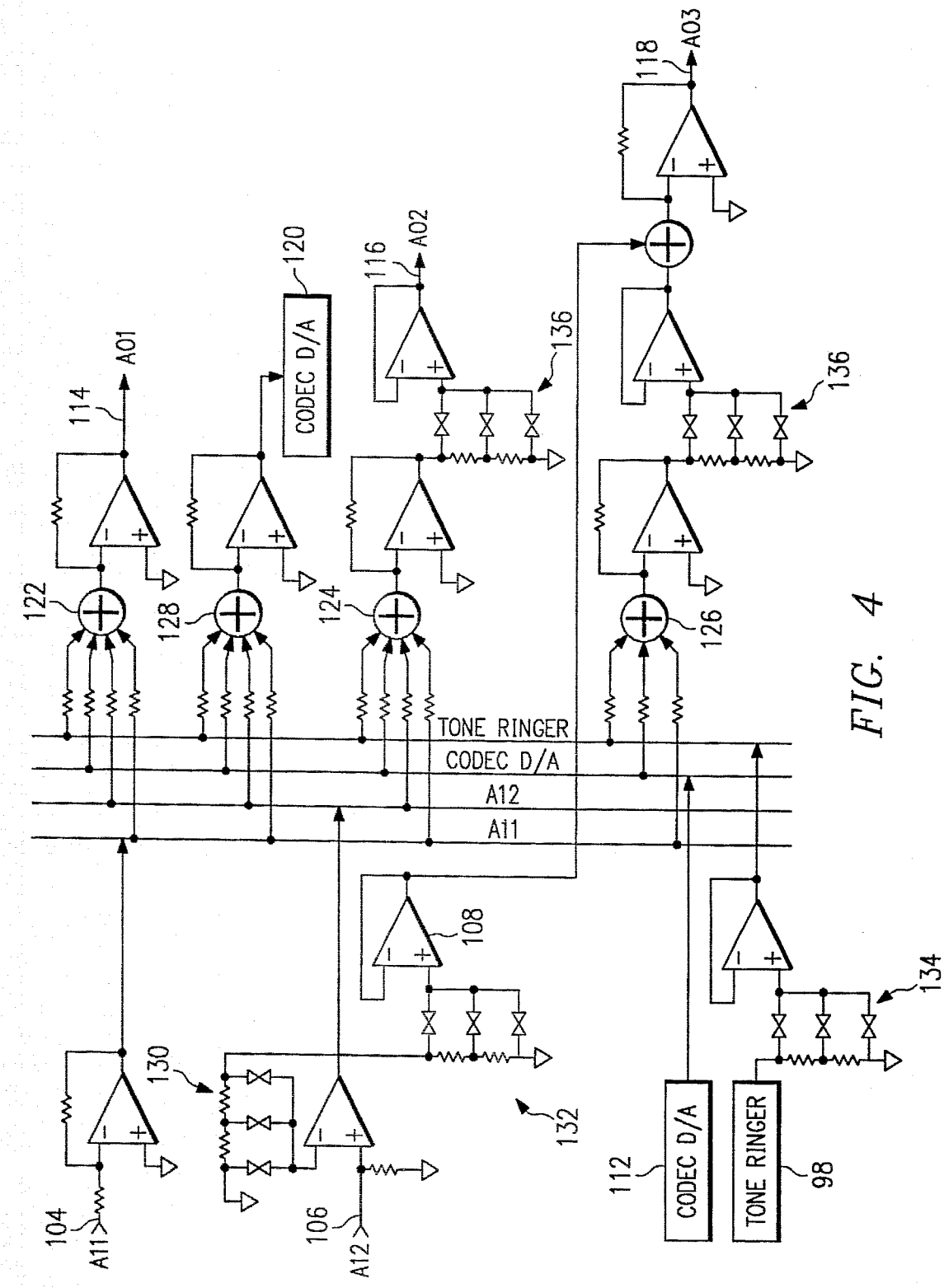
FIG. 4 is a block diagram of an audio interface of a cordless telephone into which IC's according to the teachings of the present invention have been incorporated (hereinafter, "a cordless telephone")

The audio interface 78 consists of a series of analog inputs, analog outputs, and a multiplexer connecting them, as shown in the block diagram in FIG. 4. FIG. 4, and all of the other FIGS. herein, depict all or part of the actually constructed embodiment of the present invention heretofore mentioned. Thus, all of the FIGS. in this application, as well as the discussion accompanying them, should be understood to describe the actually constructed embodiment of the present invention. With that understood, the various gains, attenuations, and interconnections arising during operation of the embodiment of the present invention shown in FIG. 4 are all software programmable. Each input buffer and output driver can be independently disabled to save power.

Referring still further to FIG. 4, it may be seen that the audio mux has five inputs (two pins 104, 106; a sidetone 108; the tone ringer 98; and a codec D/A 112; three pins 114, 116, 118; and the codec A/D 120). Under software control, the various inputs can be routed to each of the outputs, with some limitations. Possible paths are shown in FIG. 4. The selected inputs are summed at each output.

Those skilled in the art will notice with reference to FIG. 4 that a sidetone path is provided from the AI2 input 106 to the A03 output 118. In the actually constructed embodiment of the present invention, the gain is programmable from 0 dB to −42 dB in 3 dB steps.

With respect to the pins shown in FIG. 4, as those skilled in the art should be well aware, pins AI1 and AI2 are analog input pins and pins A01, A02, and A03 are analog output pins. There are nine user visible registers associated with the audio interface and shown in FIG. 4, those being an A01 MUX control 122, an A02 MUX control 124, an A03 MUX control 126, a codec A/D MUX control 128, an A12 control register 130, a sidetone AI1 control register 132, a tone ringer amplitude register 134, and an A02, A03 attenuator control 136.

Audio Path—Codec

Figure 3A:
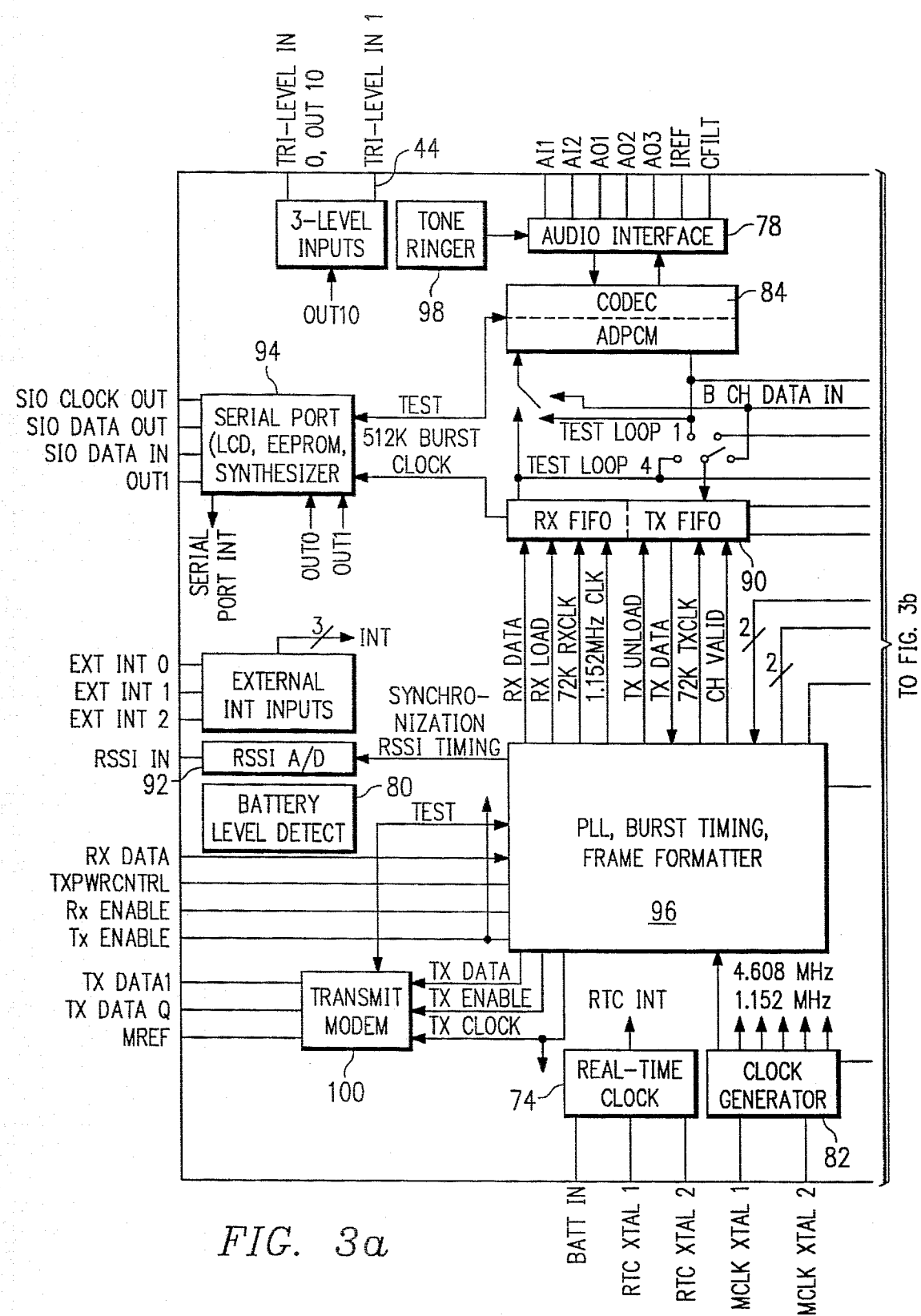
FIG. 3 (which consists of FIG. 3a and FIG. 3b) is a block diagram of an IC according to the teachings of the present invention.
Figure 3B:
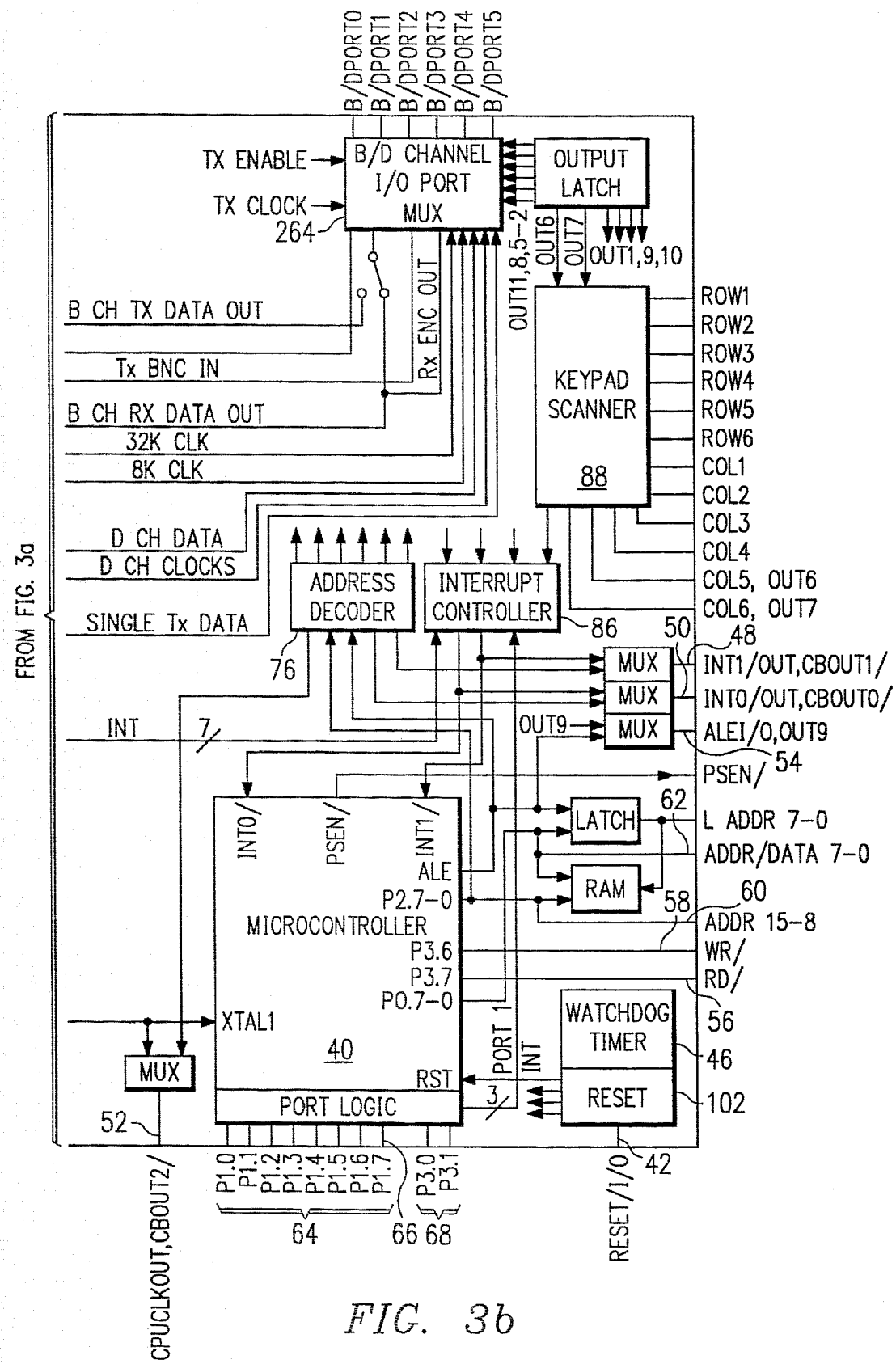

The codec portion of the audio path is located between the ADPCM transcoder (heretofore identified as codec/ADPCM 84) and the audio interface 78 (See FIG. 3a). The codec portion of the audio path provides a codec function, a DTMF-only mode function, an A-Law test mode function, a loopback 2 function, and a codec/ADPCM enable control function. Each of these functions is discussed briefly in individual paragraphs immediately below.

When the codec portion of the audio path provides a codec function, an analog to linear PCM and/or an A-Law PCM codec is provided.

With regard to the DTMF-only mode, the DSP engine has a DTMF-only mode that turns off all DSP functions but the dual-tone generator and those portions of the codec necessary to produce an output DTMF tones. In the actually constructed embodiment of the present invention, this mode is controlled via a bit in the DSP control register.

In the A-Law test mode, access is provided to the codec function allowing the codec to be tested (analog into A-Law PCM out and A-Law PCM into analog out). This test mode breaks the connection between the codec and the ADPCM transcoder, performs linear to A-Law PCM and A-Law PCM to linear conversion, and provides an access point to the 64 kbps A-Law PCM bit stream. This test mode is implemented by multiplexing the PCM data I/O and clock functions onto pins normally used for the serial I/O port. In the actually constructed embodiment of the present invention, the data is transmitted and received in eight-bit bursts using a 512 kHz clock.

With respect to the loopback 2 function, a loopback point is provided connecting the output of the transmit path (input to the ADPCM encoder) to the input of the received path (input point from the ADPCM decoder). Data at this loopback, called loopback 2, is in linear PCM format.

In the codec/ADPCM enable control function, a single bit, located in the clock generator module, is provided for enabling the transmit and receive codec paths. This bit is also used to enable the ADPCM transcoder transmit and receive paths, and the A/D summing amplifier in the audio interface.

With respect to performance requirements, the codec should meet standard CCITT G.714 signal to distortion, gain tracking, frequency response, and idle channel noise specifications.

Aside from enabling the codec, programming the desired paths, and optionally enabling the high-pass filter in the transmit path, the codec module in the actually constructed embodiment of the present invention operates without software intervention. The filters, summing points, and attenuators are implemented in microcode executed on the DSP engine.

Figure 5:
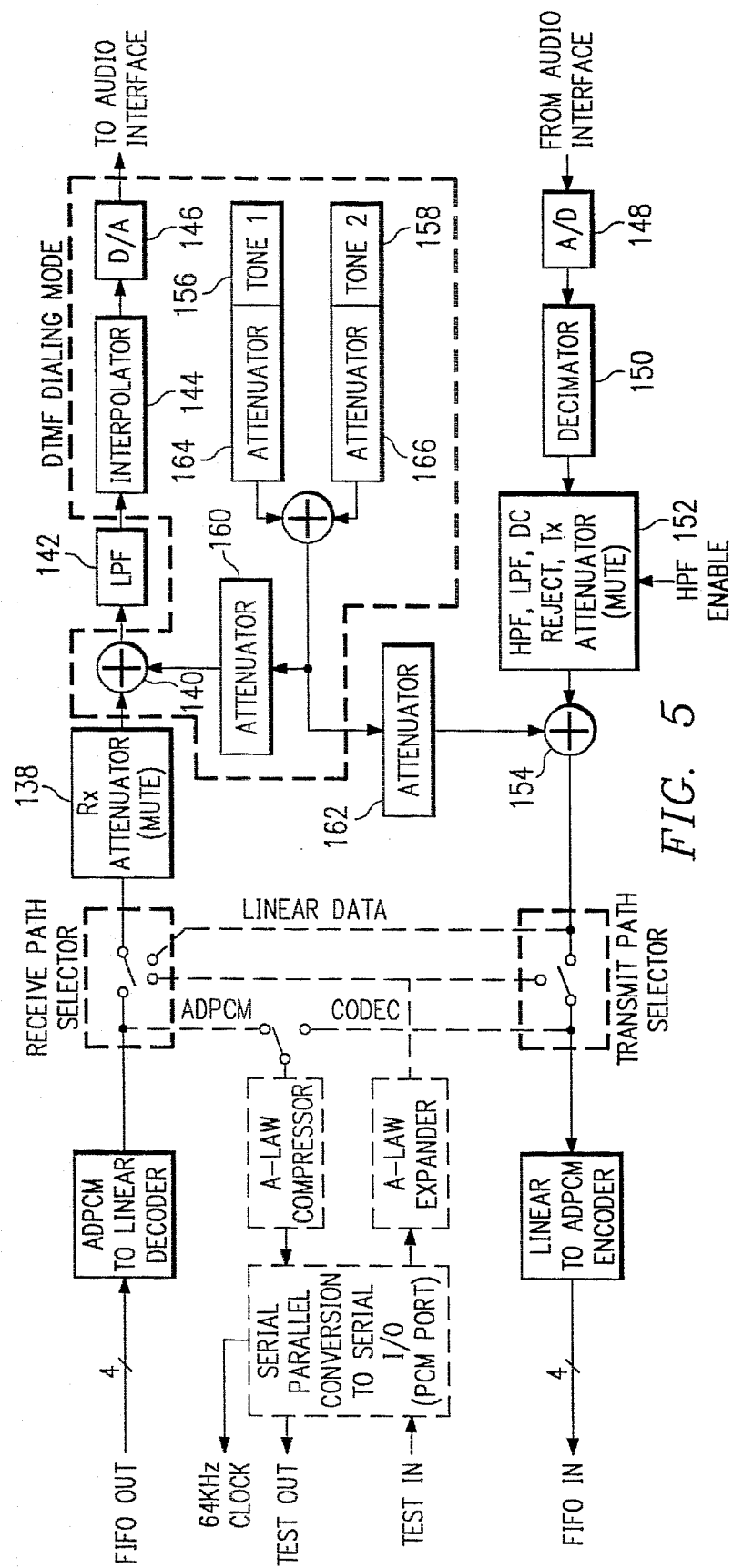
FIG. 5 is a block diagram of the audio path of a cordless telephone, excluding the analog interface.

Referring now to FIG. 5, there is shown a block diagram of the audio path, excluding the audio interface. The audio path is shown to include both a receive path and a transmit path.

Along the receive path are an attenuator/mute 138, a voice/tone summing point 140, a low-pass filter 142, an interpolator 144, and a D/A converter 146. The attenuator/mute 138 is a means to disable the receive path ahead of the voice/tone summing point. A programmable attenuator is used so that the signal can be turned off gradually. Muting is accomplished by programming the receive attenuator to an infinite attenuation. Programming minus infinity causes the ADPCM decoder to reset its recursive filters. The attenuator is programmed via a receive attenuator register. The voice/tone summing point 140 is a point at which the voice and tone signals are summed. The low-pass filter 142 is in the actually constructed embodiment of the present invention simply a standard 3400 Hz low-pass filter or the like. The interpolator 144, also in the actually constructed embodiment of the present invention, is a series of interpolators to increase the sample rate. The D/A converter 146 is a means for converting the signal from digital to analog.

In the transmit path are an A/D converter 148, a decimator 150, a filters and attenuator block 152, and a voice/tone summing point 154. The A/D converter 148 is a second order sigma/delta converter or the like which can be used to digitize the input. The decimator 150 is hardware which decimates the output of the A/D converter 148. The filters and attenuator block 152 includes an attenuator mute, a low-pass filter, a high-pass filter, and a DC reject filter. The attenuator/mute portion is a means to disable the transmit path ahead of the voice/tone summing point. A programmable attenuator may be used so that the signal can be turned off gradually. Muting is accomplished by programming the attenuator to infinite attenuation. The attenuator is programmed via a transmit attenuator register. The low-pass filter portion of the block 152 is a standard 3400 Hz low-pass filter. The high-pass filter portion of the block 152 is a 50/60 Hz rejection filter. Such a filter has a programmable enable control, that is, a DSP control register. The DC reject filter portion of block 152 removes DC offset. This filter cannot be disabled. The voice/tone summing point 154 is a point at which voice and tone signals are summed.

Figure 14:
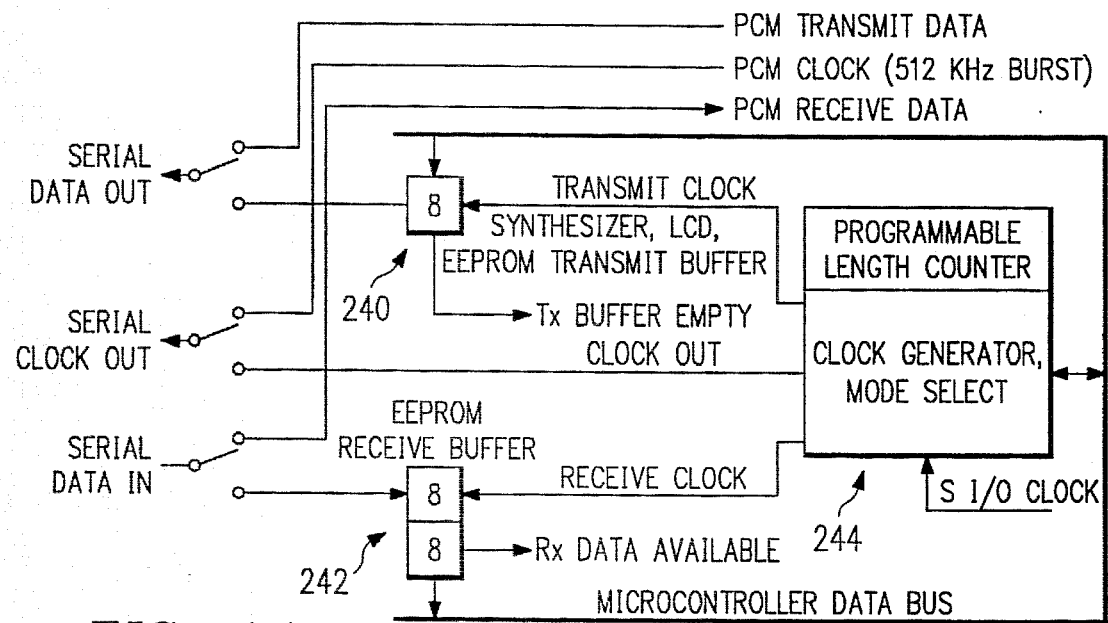
FIG. 14 shows a block diagram of a serial interface that may be present in embodiments of the present invention.

The test logic interface to the "PCM port" (see FIG. 14 and the accompanying description hereinbelow) contains a parallel to serial and a serial to parallel shift register pair. The interface to the serial I/O port module is serial, with the codec module providing the parallel to serial and serial to parallel conversion, data clock (one eight-cycle burst per frame at 512 kHz), and frame sync clock (8 kHz).

There are three registers in the codec module that are user visible, those being the DSP control register, a transmit attenuator register, and a receive attenuator register. The DSP control register controls all DSP related functions, including the ADPCM module.

Audio Path—ADPCM Transcoder

The ADPCM portion of the audio path provides a full-duplex ADPCM transcoder (linear PCM to ADPCM and ADPCM to linear PCM). The transcoder sits between the codec and the FIFOs/B channel I/O. Hereinabove, the codec and ADPCM have been generally referred to together and with reference numeral 84. In the actually constructed embodiment of the present invention, a test mode allows A-Law encoding and decoding to be added to the signal path for compatibility testing.

Further, with respect to the actually constructed embodiment of the present invention, a test mode is provided allowing access to the ADPCM portion of the audio path. This allows the ADPCM transcoder to be tested independent of the audio interface and filters (A-Law PCM into ADPCM out and ADPCM into A-Law PCM out). This mode breaks the connection between the codec and the ADPCM transcoder, providing a connection point for a 64 kbps A-Law PCM bit stream. The test mode is implemented by multiplexing the PCM data I/O and clock functions onto pins normally used for the serial I/O port (the B/D channel I/O port is used for the 32 kbps ADPCM connection).

A single programming bit is provided for enabling the DSP and audio interface. This bit is the same bit that is used to enable the codec transmit and receive paths, and is located in a module enable control register 0.

The actually constructed embodiment of the present invention complies with CCITT G.721 bit-for-bit.

The ADPCM transcoder function is microcode executed by the DSP engine. It should be noted that the input to the encoder and the output from the decoder is in linear format (not compounded PCM because the A-Law compression and expansion blocks are not used in normal operation).

With regard to data routing on the FIFO side, the ADPCM module connects to the FIFO/B channel data multiplexer. The input to the decoder and output from the encoder is in four-bit nibbles. With regard to the data routing on the codec side, reference should be made to the block diagram of the audio path, FIG. 5. The loopback 2 and test mode switches are controlled via the DSP control register, discussed in the Audio Path—Codec section above.

Audio Path—Dualtone Generator

A tone generator capable of generating two simultaneous tones is used in the actually constructed embodiment of the present invention. The output of the generator is individually summed into the transmit and receive paths, with independently controlled amplitudes. Under software control, the transmit and receive paths feeding the summing point can be muted, allowing only the tones to be output.

Referring to FIG. 5, the tone generator may be seen to consist of a tone 1 generation block 156, a tone 2 generation block 158, a receive path tone attenuator 160, and a transmit path tone attenuator 162.

With respect to the tone 1 and tone 2 generators 156, 158, the interface to each of these generators consists of four bytes of programming, three that specify the frequency and one that specifies the amplitude. Writing the tone 2 amplitude register causes all eight bytes to be loaded into the DSP, thus changing the tones. This also starts the tone generation. The tone generation is terminated by writing the zero amplitude value to the desired amplitude register (to turn off tone 1, the tone 1 amplitude register must be written with the zero amplitude coefficient, followed by a write to the tone 2 amplitude register to trigger the update of all 8 registers). Each of the two tone generators 156, 158 operates independently.

With respect to the receive path and transmit path attenuators 160, 162, the outputs of the two tone generators 156, 158 are summed together. The combined signal sums into the receive and transmit speech paths via the two attenuators 156, 158. The transmit and receive speech signals pass through their own programmable attenuators 164, 166 prior to reaching the summing point. This allows independent adjustment of the relative tone/speech levels for the transmit path and the receive path.

There are ten user visible registers in the dualtone generator module. Two pairs of four registers specify the frequency and amplitude of the two tone generators, and two control the transmit tone and receive tone attenuators.

Audio Path—Tone Ringer

The tone ringer (element 98 in FIGS. 3a and 4) is capable of generating multiple single frequency sequential square wave tones with minimal transients when switching between frequencies. The tone ringer function is capable of operating whether the codec/ADPCM 84 function is enabled or disabled.

Software programs the tone ringer with the desired frequency and amplitude, and then enables the desired audio path. The tone ringer hardware consists of a tone ringer frequency register, a tone ringer amplitude register, a counter/divider, and an attenuator. When the tone ringer is running and a new frequency is programmed into the tone ringer frequency register, the change over to the new frequency takes place only on cycle boundaries.

In the actually constructed embodiment of the present invention, the tone ringer 98 consists of a programmable eight-bit polynomial counter and associated control logic. The input clock is 288 kHz. The output feeds the tone ringer input buffer/attenuator located in the audio interface module. A control bit located in the clock generator module turns the tone ringer 98 on and off by starting and stopping the clock. This bit also disables the tone ringer attenuator and buffer.

System Control—General

Figure 6:
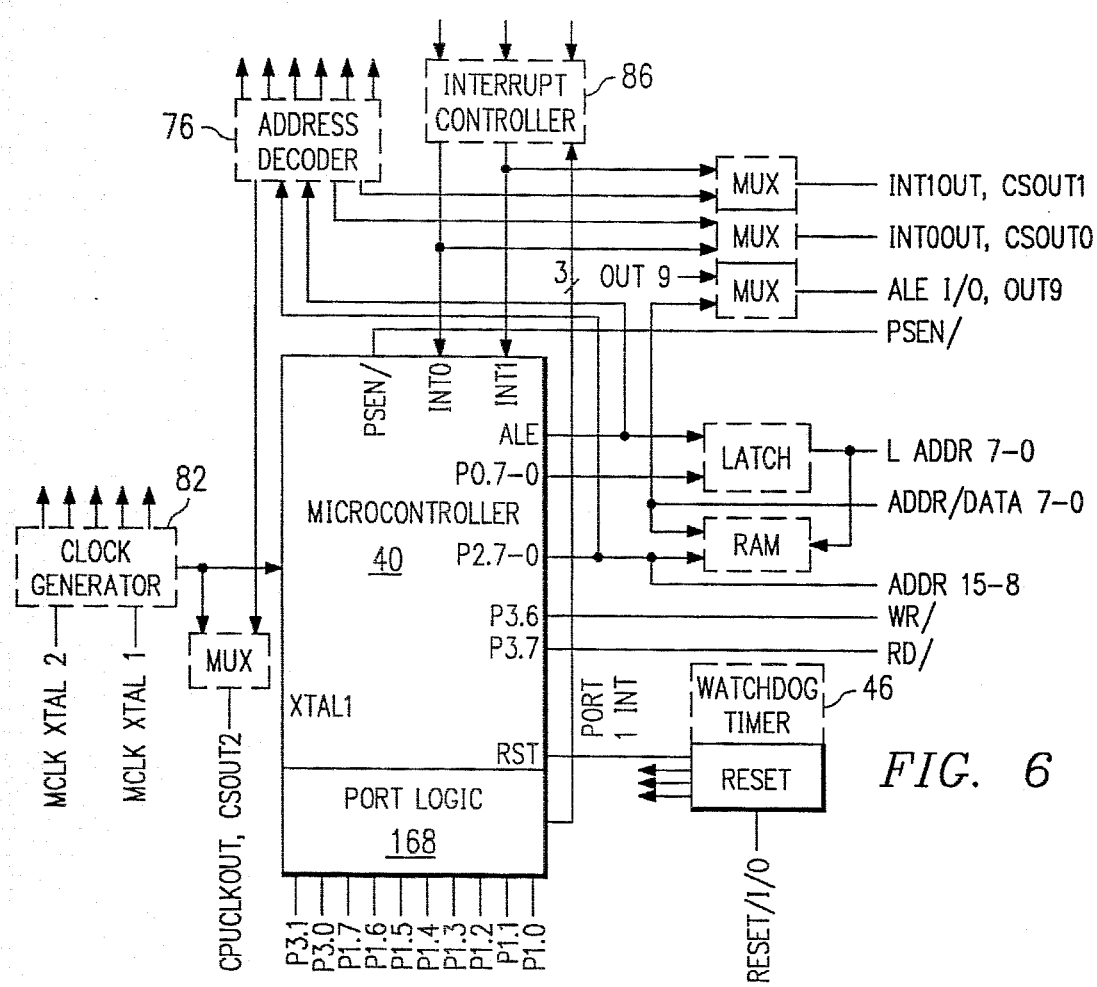
FIG. 6 is a block diagram of a microcontroller system that may form part of an IC according to the teachings of the present invention.

Referring now to FIG. 6, the system control functions in the cordless telephone application of the present invention which is described herein are performed by the microcontroller 40, the clock generator module 82, the address decoder module 86, the interrupt controller module 86, the watchdog timer/reset module 46, a parallel port module 168, a serial port module 94 (see FIG. 3a), a keypad scanner functions module 88 (see FIG. 3b), a real-time clock module 74 (see FIG. 3a), and a battery level detector module 80 (see FIG. 3a).

In the actually constructed embodiment of the present invention, an 8-bit microcontroller providing the functions of the 80C32T2 member of the 80C51 family of Advanced Micro Devices (AMD) products is integrated on-chip. It may be noted, however, that a few functions of the 80C32T2 are not implemented on the IC. For example, the oscillator function of the 80C32T2 is replaced by a clock input and the reset generator of the 80C32T2 is replaced by a reset input. Additionally, the external address select (EA/) is internally tied low, selecting off-chip ROM. In addition to the microcontroller, additional RAM as well as a demultiplexed form of the address bus is provided.

System Control—Requirements

In the actually constructed embodiment of the present invention, during emulation mode the PSEN/pin assumes a high impedance state.

As part of a functional view of the system control, it is appropriate now to discuss I/O port utilization. Accordingly, how each of the four I/O ports is used in the actually constructed embodiment of the present invention is discussed immediately below.

With regard to Port 0, it is used in connection with multiplexed address/data bus bits 7-0.

Port 1 is used for general I/O lines. These lines are mapped to specific control functions by software. The Port 1 I/O lines contain a weak pull-up. Disabling the weak pull-up is accomplished by setting a corresponding port control register bit (PCRB) to an appropriate value. After RESET, the Port 1 weak pull-ups are enabled. During emulation mode, the weak pull-ups are disabled and the port pins assume a high impedance state.

Port 2 is used for address lines 15–18. The Port 2 I/O lines contain a weak pull-up. Disabling the weak pull-up is accomplished by setting a corresponding port control register bit (PCRB) to an appropriate value. After RESET, the Port 2 weak pull -ups are enabled. During emulation mode, the weak pull-ups are disabled and the port pins assume a high impedance state.

With regard now to Port 3, P3.0, P3.1, P3.2, P3.3, P3.4, P3.5, P3.6, and P3.7 need to be discussed.

P3.0 is used as either the microcontroller serial port receive data input (RxD) or as a general purpose I/O pin. P3.1 is used as either the microcontroller serial port transmit data output (TxD) or as a general purpose I/O pin. P3.2 is used internally as an interrupt input from the internal interrupt controller (INT0/). P3.3 is used internally as an interrupt input from the internal interrupt controller (INT1/). P3.4 is used as the internal timer 0 clock input. This pin is not available external to the IC. P3.5 is used as the internal timer 1 clock input. This pin is not available external to the IC. P3.6 is the WR/ strobe for the address/data bus. P3.7 is the RD/ strobe for the address/data bus. The Port 3 I/O lines contain a weak pull-up. Disabling the weak pull-up is accomplished by setting a corresponding port control register bit (PCRB) to an appropriate value. After RESET, the Port 3 weak pull -ups are enabled. During emulation mode, the weak pull-ups are disabled and the port pins assume a high impedance state.

Discussing now I/O buffer configuration, in the actually constructed embodiment of the present invention, the Port 1, 2, and 3 I/O buffers are capable of disabling the weak p-channel pull-up through software control. The necessity of this function permits the buffers to eliminate current sourcing when the buffer is driven low by an external signal. As may be recalled from the discussion in the description of related art section above, this weak pull-up disabling feature of embodiments of the present invention eliminates undesirable power consumption increases. The AMD 80C32T2 lacks such a mechanism. After reset, all of the Port 1, 2, and 3 I/O buffers are held "high" by the weak pull-up. This state is functionally compatible with the 80C32T2 microcontroller. To disable the weak pull-up, the software must first disable each bit by configuring the port pin with the corresponding port control register bit. The corresponding port control register bit resides at the same address as the port SFR bit. For example, Port 1 resides at SFR memory location 90H. The Port 1 control register also resides at SFR memory location 90H. Modification of the Port 1 Control Register is only accomplished when the PCRA bit in the PCFIG SFR is set to a "1". When the PCRA bit is cleared, an operation to the Port SFR address results in the Port SFR getting updated.

Since only Ports 1, 2 and 3 contain weak pull-ups, Port 0 is exempt from this feature.

The following table describes the different combinations of the port setup.

| PCRB | PORT | BIT FUNCTION |
|---|---|---|
| 0 | 0 | Drives a "0" output, no pull-up (80C51 compatible) |
| 0 | 1 | Drives a "1" for 2 cycle, weak pull-up is on. (80C51 compatible) |
| 1 | 0 | Drives a "0" output, no pull-up |
| 1 | 1 | Input only, (no pull-up, high impedance input) |

Upon power-up, the PCRA bit is disabled and any writes to the ports result in the port SFR being updated. Once the PCRA bit in the PCFIG register is set, it becomes possible for each port bit to have the weak p-channel device turned off. After each port bit is appropriately configured, the user must clear the PCRA bit before writing to the ports.

If the user turns on the weak p-channel device after it is disabled, the port pin may not return to a "1" immediately. This condition is similar to the 80C51 when an external device drives the input signal low and then allows the pin to "float" back to a "1". This rise time of the signal is dependent on the loading of the pin and may take several microseconds to return to a stable "1".

Discussing now the interface to on-chip peripheral bus in the actually constructed embodiment of the present invention, all user visible registers and on-chip RAM reside on an internal version of the microcontroller address/data bus. In order to reduce power consumption, this bus does not change state during accesses to program memory space. When the IC is in an in-circuit emulation mode, this power saving feature is not available, and the on-chip peripheral bus will transition during accesses to program memory space.

Discussing now on-chip RAM in the actually constructed embodiment of the present invention, the 80C32T2 has 256 bytes of RAM located in the "Internal Data RAM" space. 1024 bytes of additional "on-chip" RAM is located in "External Data RAM" space. All of the 1024 bytes of on-chip RAM is backed up by the real-time clock's back-up battery. The backed up RAM can support read and write accesses down to 2.2 Volts. The backed up RAM can retain data down to 1.8 Volts.

Discussing now interrupt enable during shut-down in the actually constructed embodiment of the present invention, if the IC is in a shut-down mode and the microcontroller is in an idle mode, the condition of the microcontroller's interrupt mask bits (TCON register bits 7, 2, and 0) is ignored, enabling the INT0/ and INT1/ interrupts. The actual TCON bits are not changed to safeguard against the IC entering a shut-down mode with interrupts disabled.

If should also be noted that in the actually constructed embodiment of the present invention, anytime that the CPUCLK speed is programmed to be less than 9.216 MHz the length of the PSEN pulse is shortened by one cycle of CPUCLK (that is, the falling edge is delayed by one CPUCLK cycle). This reduces the power consumed by the external memory devices when the CPUCLK is slowed down.

Those skilled in the art should take note with reference to FIG. 6 that the ALE I/O pin is multiplexed with the general output bit 9. The INT0/OUT and INT1/OUT pins are multiplexed with the external I/O 0 and external RAM chip select outputs, respectively, from the address decoder module 76. During the in-circuit emulation mode, these pins always provide the ALE-OUT, INT0/, and INT1/OUTPUT functions. During normal operation, the ALE pin can be either ALE OUT or general output 9. Selection is programmed in the address decoder module. The INT0/ and INT1/ pins are always used as chip select outputs in normal operation.

Those skilled in the art should take further note with reference to FIG. 6 that a demultiplexed form of the 80C32T2's address bus is constructed by latching the low-order address byte, providing the LATCHED ADDRESS 7-0 pins. The address is latched off of the A/D 7-0 bus on the falling edge of ALE. In the actually constructed embodiment of the present invention, internal timing accounts for the delays associated with bringing A/D 7-0 and ALE on chip when the IC is in in-circuit emulation mode.

To facilitate a complete understanding of the microcontroller shown in FIG. 6 and its role in embodiments of the IC of the present invention, a brief discussion of each pin shown therein follows.

PO.7-PC.0 is the microcontroller I/O port 0. This port provides the multiplexed D7-0 and A7-0 bus. When the IC is in reset the pins are held weakly high. In shut-down, the pins will either be held strongly low or weakly high. In in-circuit emulation mode the pins are high impedance.

P1.7-P1.0 is the microcontroller I/O port 1. This port provides the eight general purpose I/O pins associated with the parallel port module. When the IC is in reset the pins are held weakly high. In shut-down, the pins hold their programmed state. In in-circuit emulation mode the pins are high impedance.

P2.7-P2.0 is the microcontroller I/O port 2. This port provides the high order eight bits of the address bus (A15-8). When the IC is in reset or shut-down, the pins are held weakly high. In in-circuit emulation mode the pins are high impedance.

P3.7 is the microcontroller I/O port 3.7. This pin provides the microcontroller RD/ (read, active low) strobe. In in-circuit emulation mode the pin is high impedance. In shut-down or during reset the pin is held weakly high.

P3.6 is the microcontroller I/O port 3.6. This pin provides the microcontroller WR/ (write, active low) strobe. In in-circuit emulation mode the pin is high impedance. In shut-down or during reset the pin is held weakly high.

P3.1 is the microcontroller I/O port 3.1. This pin provides the microcontroller's internal serial port transmit data output. The pin can also be used as a general purpose I/O port. In in-circuit emulation mode the pin is high impedance. In reset the pin is held weakly high. In shut-down the pin holds its programmed state.

P3.0 is the microcontroller I/O port 3.0. This pin provides the microcontroller's internal serial port receive data input. The pin can also be used as a general purpose I/O port. In in-circuit emulation mode the pin is high impedance. In reset the pin is held weakly high. In shut-down the pin holds its programmed state.

PSEN/ is the program store enable. When active, the address on ports 0 and 2 pertains to code space. PSEN/ is placed in a high impedance state in in-circuit emulation mode, and is an output in normal mode. In reset, PSEN/ is held weakly high. In shut-down the pin is held strongly high.

ALE is the address latch enable. This signal is used to latch the address off of the A/D 7-0 bus. ALE is high impedance during in-circuit emulation mode. ALE is an output, multiplexed with OUT9 during normal mode. In shut-down or reset the pin is held strongly high.

LATCHED ADDRESS 7-0 is the output of the address latch, providing the non-multiplexed LA7-0 bus. At reset, shut-down, and in in-circuit emulation mode these pins are driven strongly.

System Control—Clock Generator

The clock generator 82 (see FIG. 3a) provides the crystal oscillator, power mode control, module enable control, and clock dividers for the IC.

When the IC is placed in shut-down mode the 18.432 MHz oscillator (e.g., oscillator 72 in FIG. 2) and all clocks derived from it are stopped. All modules are disabled except the real-time clock 74. All analog pins are placed in their off state, that is, the same state as when the IC is in reset.

The IC is placed into shut-down mode by setting a bit in a shut-down/microcontroller clock control register. After the bit is set the oscillator 72 continues to run for 3.56–7.12 milliseconds in order for software to place itself in its idle mode, then all clocks, including the CPUCLK are stopped. In the actually constructed embodiment of the present invention, the IC terminates the shut-down cycle if an interrupt is received after the enable bit is set, and before the CPU clock is stopped.

Continuing to discuss the actually constructed embodiment of the present invention, access to the shut-down/microcontroller clock control register is protected by an interlock mechanism to reduce the risk of accidental clock stoppage due to software problems. This mechanism requires the software to write to a special access control register, and then write the shut-down/microcontroller clock control register. This double-write procedure must be done twice before the clock speed control register is updated.

Wake-up comes from reset, an any-key-down indication from the keypad scanner 88, the real-time clock interrupt (if not masked within the real-time clock 74), or any non-masked interrupt. When the IC leaves shut-down mode the oscillator is re-started. A delay of approximately 3.56 milliseconds is required for the oscillator to stabilize. After this delay, the microcontroller 44 and watchdog timer 46 clocks are re-started. The microcontroller clock re-starts at the previously programmed rate.

When the IC is in shut-down, the keypad any-key-down and real-time clock interrupts are enabled, even if the associated interrupt enable bits are cleared, i.e., even if the interrupts are disabled. The actual interrupt enable bits are not changed. Also, it should be noted that the real-time clock interrupts can still be masked within the real-time clock module 74 in the actually constructed embodiment of the present invention.

The actually employed microcontroller clock has a programmable divider with an input of 18.432 MHz. The programmable rates are divided by 2, 4, 8, 16, 32, 64, 128, and 256. When the IC leaves the shut-down mode, the CPU clock returns to the speed programmed in the control register. The CPUCLK can be turned off by placing the IC in shut-down mode.

When the clock speed is changed, the transition to the new frequency is accomplished without producing clock pulses that violate the 80C32T2, or other such appropriate product, data sheet timing specifications.

The microcontroller clock also has a selectable automatic speed-up mode. If the automatic speed-up option is selected, all interrupts force the microcontroller clock divider to the divide by two state. After the clock is sped-up, it will remain at the divided by two frequency until the speed is reprogrammed to a lower value. No illegally short pulses are allowed at the frequency transition point.

Once the command is issued by the microcontroller to enter shut-down, the processor clock continues to run for between 3.56 and 7.12 milliseconds before being stopped.

The clocks to each module are provided by the clock generator module 82. Control bits are provided to allow software to turn on and off specific modules. When a module is turned off, its clock is stopped and held low.

The serial port 94 supports data rates of 288 kHz, 144 kHz, and 36 kHz. The clock provided to the serial port module is divided down to the desired data rate by the clock generator module 82. The clock speed is selected via the serial port timing control register. The serial port module and this clock are enabled via a module enable control register 0. When the module is disabled, the clock is stopped low.

Figure 7:
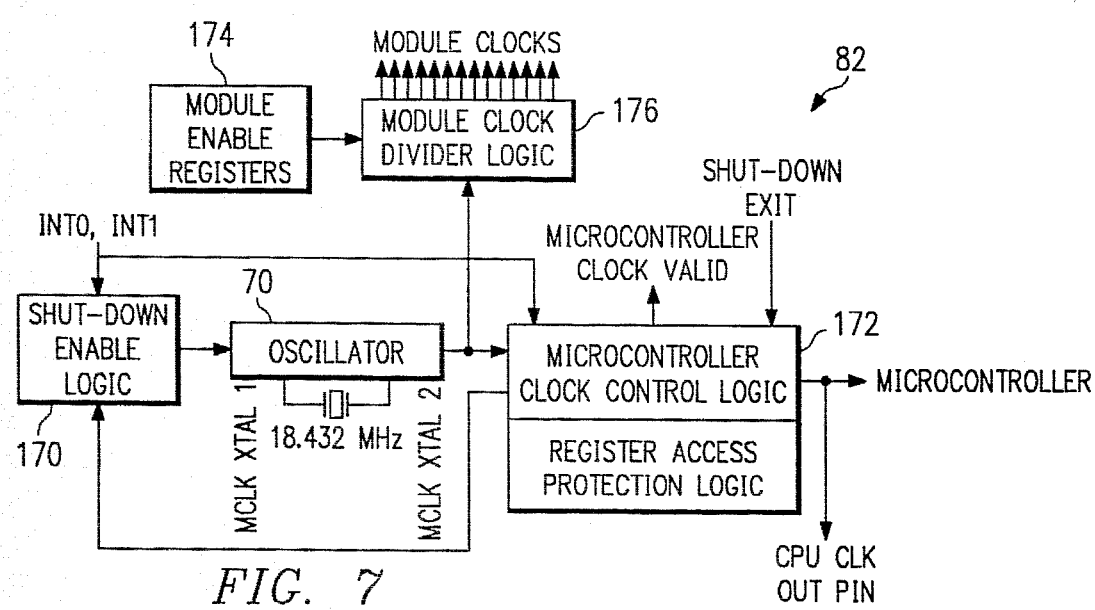
FIG. 7 is a block diagram of a clock generator module that may form part of an IC according to the teachings of the present invention.

FIG. 7 is a block diagram of the clock generator module. As may be seen in FIG. 7, the clock generator module directly or indirectly comprises the oscillator 70, shut-down mode control logic 170, microcontroller clock control logic 172, module enables 174, and a module clock divider 176. Each of these is described further in an individual paragraph immediately below.

The oscillator 70 is designed to run at 18.432 MHz, using a parallel resonant mode crystal. Start-up capacitors are required; however, the actually constructed embodiment minimizes capacitance value to save power.

The shut-down mode/microcontroller clock control logic 170, 172 controls the entry into shut-down, microcontroller clock frequency, and automatic speed-up.

With respect to the module enables 174, register bits to turn on and off specific modules within the IC are located in the clock generator module 82. These bits also stop the clock outputs to their respective modules.

The module clock divider logic 176 is a divider chain that produces the clock frequencies required by each module.

The clock generator module 82 has three pins. Pin MCLK XTAL is the master clock crystal pin 1. This pin is for input and is on the input side of the oscillator 70. The oscillator 70 is designed to work with either a parallel resonant crystal or an external logic level input. The MCLK XTAL 2 pin is the master clock crystal pin 2. This pin is for output and is on the output side of the oscillator 70. If a crystal is used, this pin is connected to the crystal. If an external logic level signal is used, this pin is left unconnected. The CPUCLKOUT pin is connected to the same clock that feeds the microcontroller 40. It is an output that can be routed off chip. In in-circuit emulation mode, the CPUCLKOUT is always active. When the IC is not in in-circuit emulation mode, this clock is multiplexed with the CSOUT2/signal from the parallel I/O port module. The multiplexer control is located in the address decoder module 76 (see FIG. 3*b*). In reset, this pin defaults to the CSOUT2/function, and is held high. At shut-down, if the pin is programmed for CPUCLK operation it is held low.

The actually constructed clock controller module 82 contains the following programmable registers: a shut-down/microcontroller clock control register; a shut-down/microcontroller clock access; a protection register; a module enable control register 1; a module enable control register 2; and a serial port timing control register.

System Control—Address Decoder

The addresses of all internal registers as well as the on-chip RAM and the three external chip selects are decoded by the address decoder module 76. Enable signals are generated when internal registers or internal RAM is accessed by the microcontroller. Chip selects outputs are generated when external RAM space or either of the two external I/O spaces are accessed.

The actually constructed address decoder module 76 includes a CSOUT0/pin, a CSOUT1/pin and a CSOUT2/ pin. The CSOUT0/pin carries a signal which is multiplexed with the INT0/OUT signal. This pin also provides the chip select function when the IC is not in in-circuit emulation mode. The CSOUT0/signal is active (low) when a MOVX instruction is executed to the external I/O 1 space. In reset or shut-down this pin is held high. The CSOUT1/ pin carries a signal which is multiplexed with the INT1/OUT signal. This pin also provides the chip select function when the IC is not in in-circuit emulation mode. The CSOUT1/ signal is active (low) when a MOVX instruction is executed to the external RAM space. In reset or shut-down this pin is held high. The CSOUT2/pin carries a signal which is multiplexed with the CPUCLKOUT signal. This pin also provides the chip select function when the IC is not in in-circuit emulation mode and the CSOUT2/ enable bit is set in a chip select control register. The CSOUT2/ signal is active (low) when a MOVX instruction is executed to the external I/O 2 space. In reset, this pin is held high. If the pin is programmed for CSOUT2/ mode, it is held high in shut-down.

The aforementioned chip select control register is the only user visible register in the address decoder module 76.

It may also be noted that the actually constructed address decoder module 76 includes an address latch and an associated pin. The address latch provides the latched form of the low order eight address bits (LADDR 7-0). The latched address bus (LADDR 7-0) pins are outputs when the IC is in normal, shut-down, or in-circuit emulation modes. When the IC is in shut-down, the pins are driven strongly with the last value before entering shut-down. The outputs change on the falling edge of ALE.

System Control—Interrupt Controller

The interrupt controller 86 gathers interrupt requests from various sources internal and external to the IC and generates an interrupt to the microcontroller 40 (INT0/ and INT1/).

The interrupt system employed in the actually constructed embodiment of the present invention has a multilevel structure, including interrupt causes and status registers, a local mask, a local interrupt source register, a main interrupt mask register, and a main interrupt source register. Each of these elements is discussed further in an individual paragraph immediately below.

With regard to interrupt causes and status registers, the causes of the interrupts form the lowest level, and are local to each module. These causes can be inputs to pins, conditions such as empty or full data buffers, and the like. The causes are reported in "status registers". A status register, when read by software, always returns the current state of cause signal (for example, the current logic level on an input pin). The bits in a status register are not affected by interrupt masking.

Discussing now the local mask, the cause signals are ANDed with associated mask signals from an "interrupt mask register". The output of these AND gates connect to a "local interrupt source register". The mask register is located in the module that contains the associated cause signals.

The local interrupt source register is used by software to determine the cause of an interrupt. The bits in the interrupt source register can be set by either rising edge, falling edge, or both edges of the non-masked cause signal. The bits in interrupt source registers are cleared separately from each other. In general, each bit is cleared when software responds to the cause. This response can be reading a receive buffer, reading an input port status register, or the like. The outputs of each of the register bits is ORed together to produce one interrupt request signal. This signal is sent to the interrupt controller module. The source register is located in the module that contains the associated cause signals.

With respect to the main interrupt mask register, the interrupt request signals are ANDed with associated mask signals from the "main interrupt mask register" (located in the interrupt controller module 86). The output of these AND gates connect to a "main local interrupt source register".

The main interrupt source register is used by software to determine the cause of an interrupt. The bits in the interrupt source register reflect the logic level of the interrupt request signals, provided they are not masked. In general, each interrupt request is cleared when software responds to the specific interrupt cause. The outputs of the main interrupt source register are ORed together and forwarded to the microcontroller.

Figure 8:
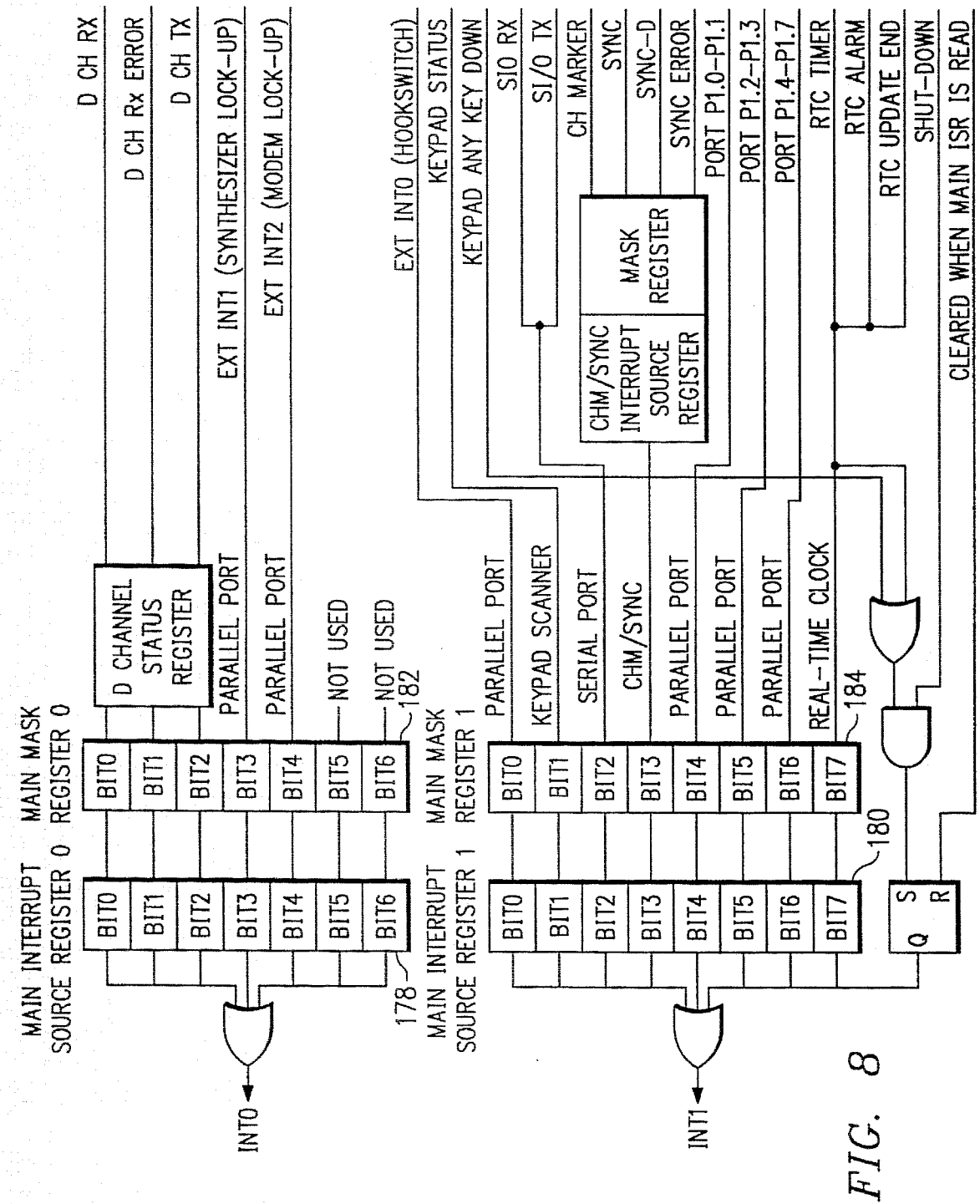
FIG. 8 shows a possible structure for an interrupt controller that may form part of an IC according to the teachings of the present invention.

FIG. 8 shows the structure of the interrupt controller 86. Interrupt requests from the logic module 96 (see FIG. 3a), external interrupt inputs (such as hookswitch/lock-ups), the serial I/O 94, the parallel I/O (see FIG. 13 and the accompanying discussion), keypad scanner 88, and the real-time clock 74 modules feed the two main interrupt source registers 178, 180. A master interrupt mask function is provided in the microcontroller in the form of a main mask register 0 182, and a main mask register 1 184.

By way of example only, set forth immediately below is a list of interrupt causes in the actually constructed embodiment of the present invention employed in a cordless telephone application.

| INTERRUPT CAUSE | SET/CLEARED |
|---|---|
| D channel receive | SET: Receive buffer contains 6 bytes of data<br>CLEARED: When receive buffer is read |
| D channel receive error | SET: Error detected in received D channel data<br>CLEARED: D Channel Status Register is read |
| D channel transmit | SET: Transmit buffer empty<br>CLEARED: When transmit buffer is loaded |
| SI/O receive | SET: Receive buffer full<br>CLEARED: Reading receive buffer |
| SI/O transmit | SET: Transmit buffer empty<br>CLEARED: When transmit buffer is loaded |
| RTC timer | SET: Timer bit set (and not masked) in RTC Source Register<br>CLEARED: Reading RTC Source Register |
| RTC alarm | SET: Alarm bit set (and not masked) in RTC Source Register<br>CLEARED: Reading RTC Source Register |
| RTC update end | SET: Update end bit set (and not masked) in RTC Source Register<br>CLEARED: Reading RTC Source Register |
| PI/O P1.0–P1.1 | SET: Programmed edge of non-masked port 1 pin<br>CLEARED: Reading PI/O Interrupt Source Register 0 |
| PI/O P1.2–P1.3 | SET: Programmed edge of non-masked port 1 pin<br>CLEARED: Reading PI/O Interrupt Source Register 1 |
| PI/O P1.4–P1.7 | SET: Programmed edge of non-masked port 1 pin<br>CLEARED: Reading PI/O Interrupt Source Register 2 |
| Keypad status | SET: Change in Keypad Status Register<br>CLEARED: Reading Keypad Status Register |
| Keypad any key down | SET: Key closure when IC is in shut-down mode<br>CLEARED: Reading Main Interrupt Source Register 1 |
| External interrupt inputs 1, 2, and 3 | SET: Any transition of the external interrupt input pins (normally used for hookswitch, synthesizer lockup, and modulator lock-up<br>CLEARED: Reading the indicated External Interrupt Status Register (one register for each input) |
| CHM | SET: Rising edge of CHM signal<br>CLEARED: Reading CHM/Sync Source Register |
| SYNC | SET: Rising edge of sync signal<br>CLEARED: Reading CHM/Sync Source Register |
| SYNC-D | SET: Rising edge of sync-D signal<br>CLEARED: Reading CHM/Sync Source Register |
| Sync error | SET: Rising edge of sync error signal<br>CLEARED: Reading CHM/Sync Source Register |

Figure 9:
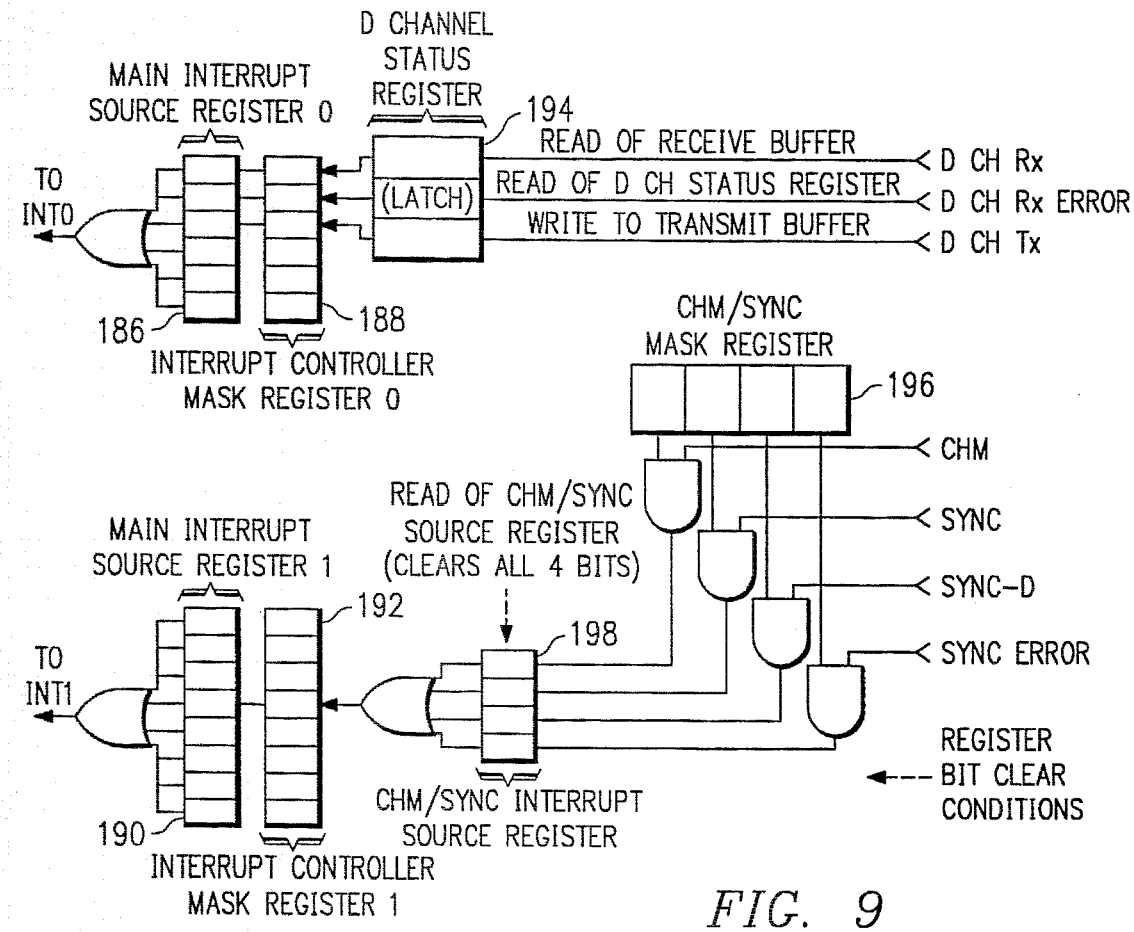
FIG. 9 shows a possible structure of the status, mask, and source registers necessary to handle interrupt cause signals from a logic module in an IC according to the teachings of the present invention.

FIG. 9 shows the structure of the status, mask, and source registers necessary to handle interrupt cause signals from the logic module 96.

The interrupt controller module 86 is comprised of seven user-accessible registers: a main interrupt source register 0 186; a main interrupt mask register 0 188; a main interrupt source register 1 190; a main interrupt mask register 1192; a D-channel status register 194; a CHM/SYNC mask register 196; and a CHM/SYNC interrupt source register 198.

The interrupt controller 86 includes an INT0/OUT pin, and an INT1/OUT pin. The INT0/OUT signal is an output from the interrupt controller 86 to the microcontroller 40. It is routed off-chip via the INT0/OUT pins. It is used only in in-circuit emulation mode. When the IC is not in in-circuit emulation mode, this pin is used for the chip select zero (CSOUT0) output. The INT1/OUT pin carries a signal which is an output from the interrupt controller 86 to the microcontroller 40. It is routed off-chip via the INT1/OUT pin. It is used only in in-circuit emulation mode. When the IC is not in in-circuit emulation mode, this pin is used for the chip select one (CSOUT1) output.

User accessible registers in the interrupt controller module include the main interrupt source register 0 186; the main interrupt source register 1 190; the main interrupt mask register 0 188; the main interrupt mask register 1 192; the D channel status register; the CHM/Sync interrupt source register 198; and the CHM/Sync mask register 196.

System Control—Watchdog Timer/Reset

The watchdog timer 46 detects if the microcontroller software becomes hung-up or lost, and generates a hardware reset to the IC as well as the rest of the system. A hardware reset is generated if an internal counter is not cleared every two seconds. The counter is cleared by the microcontroller 40 writing a specific code sequence to an internal watchdog key register. It should be noted that the watchdog timer 46 is not operational in shut-down or in-circuit emulation modes.

Figure 10:
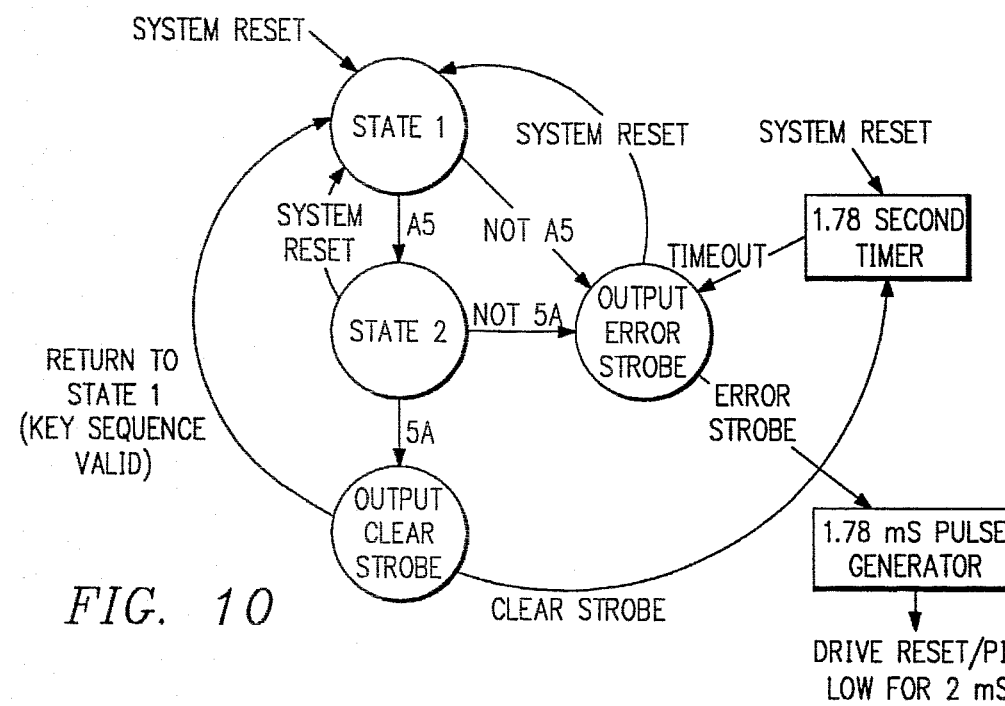
FIG. 10 shows a state diagram of a watchdog timer and a reset output mechanism that may form part of an IC according to the teachings of the present invention.

FIG. 10 is a state diagram of the watchdog timer and the reset output mechanism.

The actually constructed watchdog timer 46 generates a 1.78 ms pulse on the RESET/ (active low) pin if it times out. Hardware internal to the IC is also reset by a watchdog timer time-out; the result is identical to activating the RESET/pin. The time-out value is approximately 1.78 seconds. A specific key sequence must be written to the aforementioned internal watchdog key register within this 1.78 seconds after reset, and within 1.78 seconds of the previous update, to prevent time-out.

The key sequence is a two stage function starting from reset. The watchdog timer 46 starts in stage one, waiting for a write to the watchdog key register. If the value written to the watchdog key register is anything but an A5H, a system reset is generated (just as if the terminal count had been reached). If the write was an A5H, stage two is entered. In stage two, the watchdog timer 46 waits for another write. If the write is a 5AH, the timer is reset and stage one is re-entered. If the write is something other than a 5AH, a system reset is generated.

Figure 11:
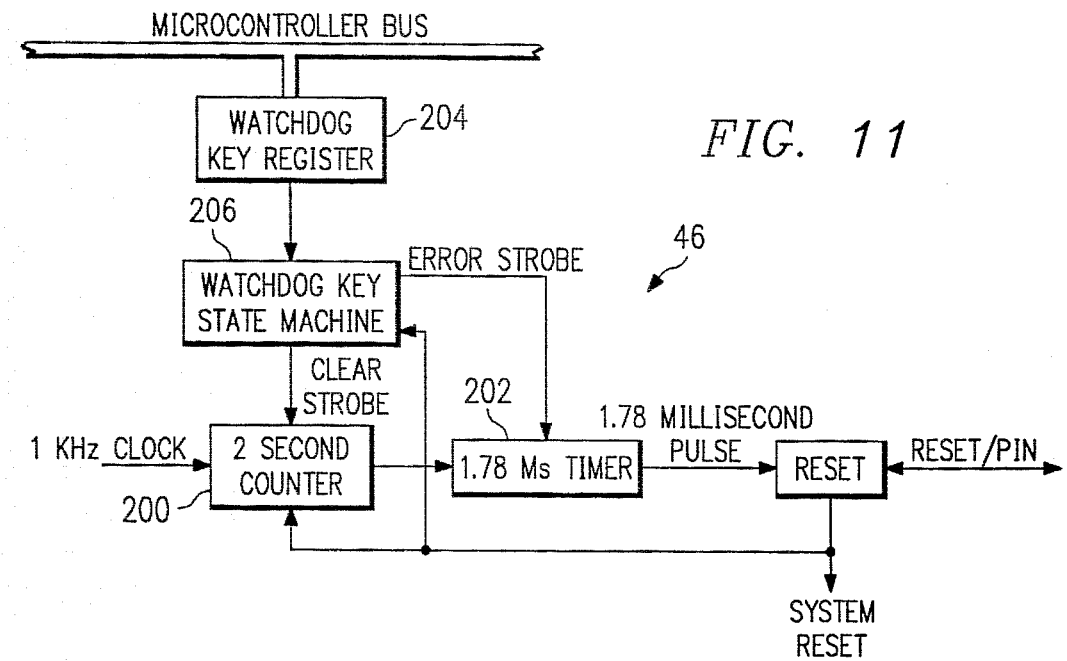
FIG. 11 shows a possible organization of a watchdog timer that may form part of an IC according to the teachings of the present invention.

FIG. 11 shows the organization of the watchdog timer used in the actually constructed embodiment of the present invention.

The timer chain comprises a two second counter 200 and a two millisecond pulse generator 202. A 1 kHz clock is received from the clock generator module 82 and fed to the disable control block. The clock output signal feeds the two millisecond pulse generator 202 and the two second counter 200. The terminal count output of the two second counter 200 is fed to the pulse generator 202 to initiate the generation of a two millisecond pulse.

The watchdog key mechanism consists of a user visible register 204 and a state machine 206. The user visible register 204 is written periodically by software 35 to indicate that the software is functioning normally. The state machine 206 verifies that the register is updated correctly, generating a clear strobe to the two second counter 200 if all is well, and an error strobe to the two millisecond counter 202 if the register is updated incorrectly.

The watchdog key register 204 is the access point where software clears the watchdog timer 46. A sequence of two writes is required to clear the timer 46. In the actually constructed embodiment of the present invention, this sequence must be performed every two seconds to prevent the generation of a system reset.

System Control—Parallel Port

The actually constructed parallel I/O port consists of the micro-controller port 1 interrupt structure, a 11-bit general purpose output latch, 2 tri-level input pins, and three external interrupt inputs. The RxD and TxD pins in microcontroller port 3 can also operate as general purpose I/O ports. These ports are organized as discussed immediately below.

With respect to the microcontroller port P1.0-P1.7, maskable interrupts are programmably generated on one edge of each pin. In the actually constructed embodiment of the present invention, for interrupt reporting purposes, the pins are divided into three separate interrupt source registers, one for P1.7-4, one for P1.3-2, and one for P1.1-0.

The general purpose outputs, of which there are 11, are programmed via the general purpose outputs registers 0 and 1. The outputs all default high.

The two tri-level input single pins can report three input states, high, low, or open. Typical applications are dial type selection and factory test mode selection. Additionally, as discussed in considerable detail above, TRI-LEVEL IN1 is used to select in-circuit emulation mode.

With respect to the external interrupt inputs, three input pins are provided that generate interrupt requests on both rising and falling edges. These pins can be used for hook-switch, channel synthesizer lock-up, and modem synthesizer lock-up inputs.

Figure 12:
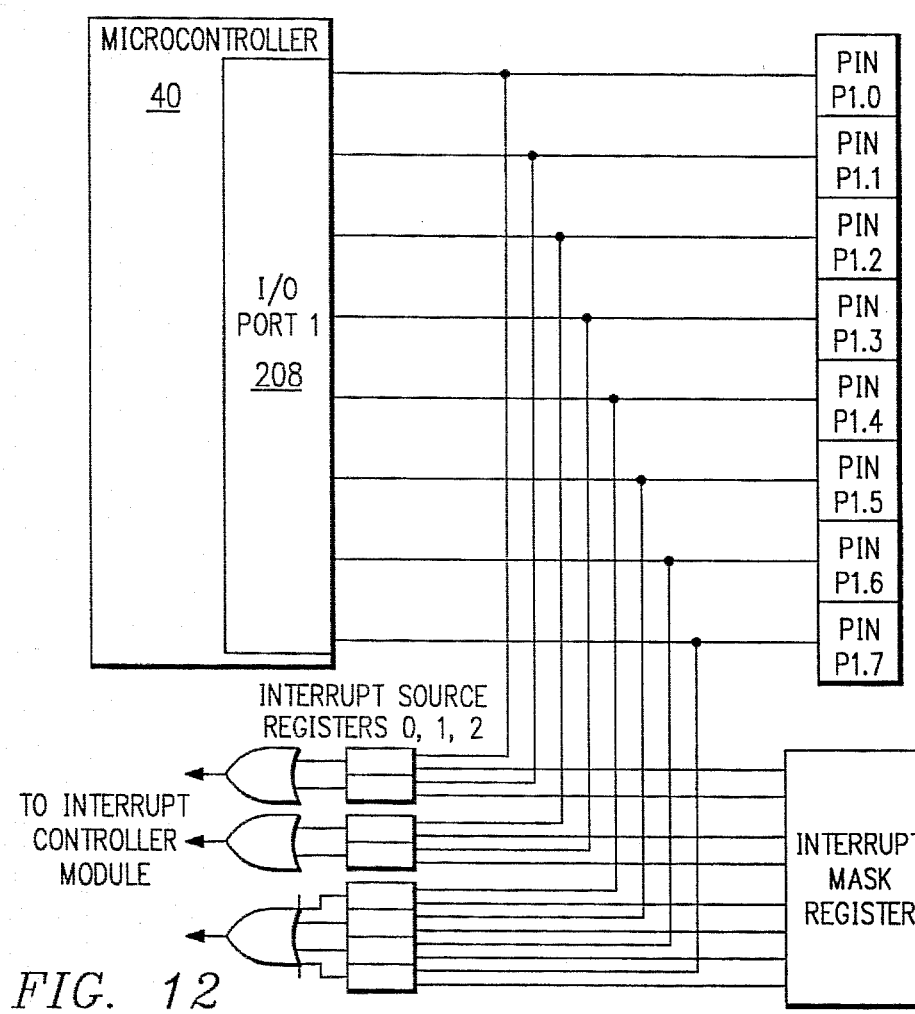
FIG. 12 shows a possible basic structure of an interrupt function mechanism that may form part of an IC according to the teachings of the present invention.

Functionally, all eight of the port 1 pins, when programmed as inputs, can generate maskable interrupts on edge transitions. The interrupt function is implemented in hardware separate from the microcontroller. FIG. 12 shows the basic structure of the interrupt function.

Referring to FIG. 12, the output latch provides 11 general purpose output pins for controlling external functions. This is a simple pair of registers (one 7-bit and one 4-bit) residing on the microcontroller data bus. When a bit is set in one of the registers (by software), the corresponding output pin is also set. When the bit is cleared, the pin is cleared. All pins that provide one of the general purpose outputs as their default state, default to a high level.

The multiplexing control for all pins except the keypad (OUT 6, 7) and tri-level input (OUT 10) is located in the module where their other function originates, not in the parallel port module (designated by reference numeral 208 in FIG. 12). The keypad and tri-level multiplexing is controlled in general purpose output register 1.

When the parallel I/O port is disabled, via a module enable control register 0 located in the clock generator module 82, all pins that are operating as general purpose outputs are placed in a high impedance state.

Continuing to refer to FIG. 12, two pins are provided that can detect three distinct input states: high, low, and open, or no connect. The state of the input is reported in an external interrupt status register. These pins do not generate interrupt requests. The TRI-LEVEL IN1 pin is used primarily for selecting the operating mode of the IC after the RESET pin goes inactive. The TRI-LEVEL IN1 pin can be used as a general input in slight variations of the actually constructed embodiment of the present invention, but extreme care should be taken since a reset could cause the IC to enter the in-circuit emulation mode.

Referring still further to FIG. 12, three interrupt inputs are provided that generate interrupt requests on both rising and falling transitions. The status of each input pin is reported in a separate one-bit register. If a pin changes state since the last time its status register was read or reset, an interrupt request is latched and sent to the interrupt controller module. Reading the source register clears the latch and thus the interrupt request.

In general, in FIG. 12, it may be seen that the 11 outputs are independently controlled by their respective bits in the general purpose output control registers 0 and 1. Further, the input pins are pulled to mid-supply (Vcc/2) by pull-up and pull-down resistors when read. The pins each feed a separate pair of comparators. One is biased to produce a high at its output if the input is high, and one is biased to produce a high at its output if the input is low. If the input is open, both comparators output a low state. Still further, it may be noted that the pin logic should be designed to disable the pull-up and pull-down resistors when the state of the pin is not being evaluated. This is a power saving feature. The maximum resistance of the external input with respect to Vcc or Vss is 50 Ohms (when the input is high or low). The maximum capacitance is 50 pF.

Figure 13:
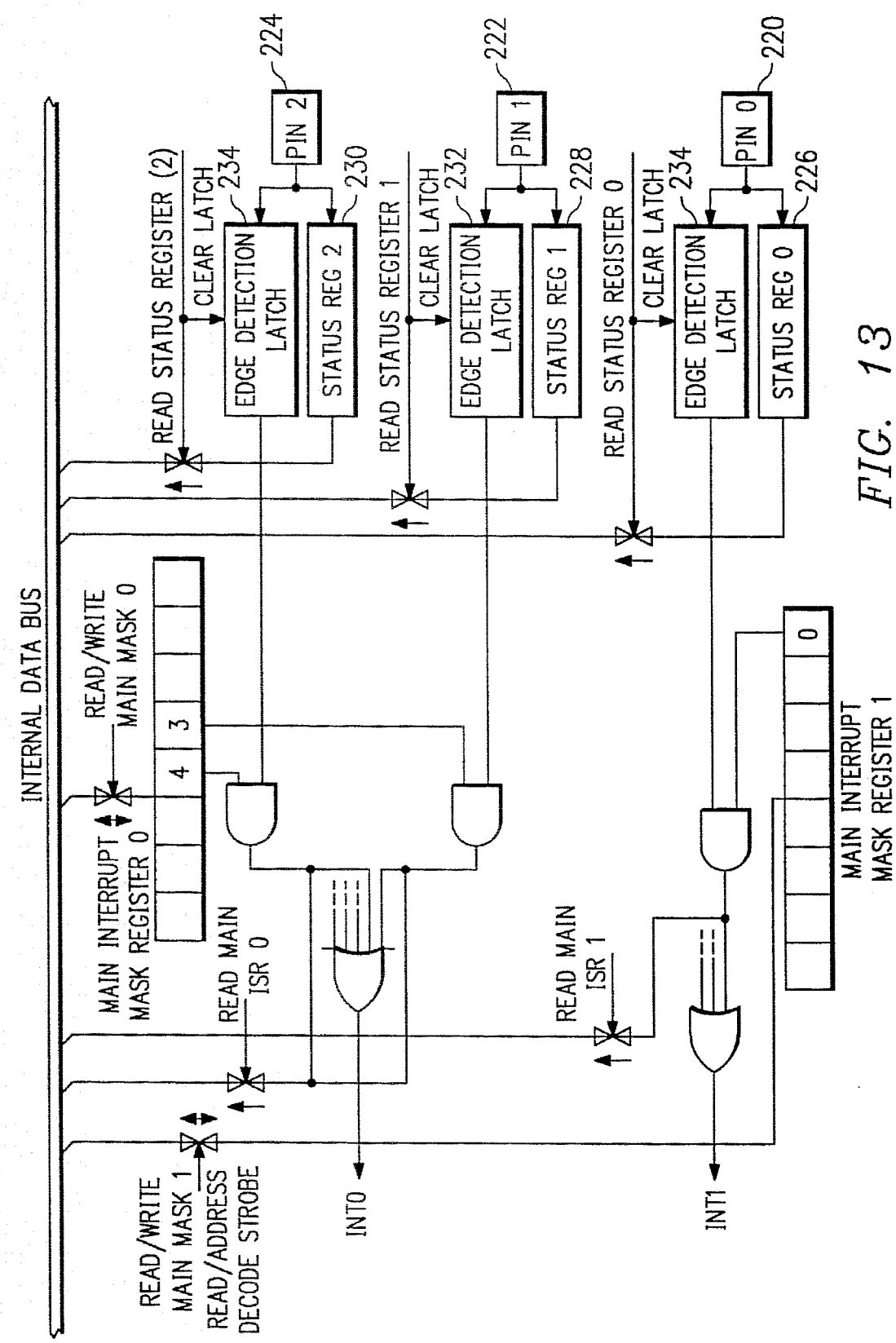
FIG. 13 shows an external interrupt input structure that may be present in embodiments of the present invention.

Referring now to FIG. 13, there is shown a more detailed view of the external interrupt input structure. It may be seen therein that this structure comprises three input pins 220, 222, 224, three status registers 226, 228, 230, and three transition detector latches 232, 234, 236.

The three external interrupt input status registers 226, 228, 230, which are one-bit registers, report the current status of the external interrupt input pins 220, 222, 224. The status bit changes as the pins change. Reading one of the registers clears the associated transition detector latch 232, 234, 236. The output of each latch 232, 234, 236 is fed to the interrupt controller module 86 where it is ANDed with an enable bit.

System Control—Serial Port

The serial interface is a combination of four serial channels. In the actually constructed embodiment of the present invention, these channels provide communication with frequency synthesizers, an LCD controller, an EEPROM, and a PCM codec test equipment. A combined set of transmit, receive, and clock logic is used to support the synthesizer, LCD, EEPROM, and PCM interfaces (see FIG. 14 wherein the transmit, receive and clock logic are generally designated by reference numerals 240, 242 and 246, respectively). This combined set of hardware is referred to as the SI/O interface.

With respect to the actually constructed synthesizer interface, it may be noted that communication between the IC and a synthesizer chip, e.g., an MB1501 synthesizer chip, is unidirectional. Communication goes only from the IC to the synthesizer.

With respect to the actually constructed LCD interface, a serial interface is provided for communicating between the on-chip microcontroller and an NEC µPD7225 LCD controller IC, or the like. This is also a one direction interface, with communication going only from the IC to the LCD controller.

The actually constructed EEPROM interface is bidirectional, and is compatible with 8- and 16-bit devices that support the National, General Instruments, Exel interface. Additionally, support for devices that output data on the falling edge of the clock is required. Thus, for compatibility with a wide variety of devices, the port can be programmed to receive data on the rising or falling edge.

With respect to the actually constructed PCM test port, two special modes can be invoked from software that will convert the serial port to a codec or ADPCM transcoder test port. In codec test mode, the Data In pin becomes the 64 kbps codec receive input, the Data Out pin becomes the 64 kbps codec transmit output, and the Clock pin becomes a gated 512 kHz PCM data clock output (bursts of eight cycles at the 8 kHz frame rate). In ADPCM test mode the Data In pin becomes the 64 kbps ADPCM transmit input (PCM data input), the Data Out pin becomes the 64 kbps ADPCM receive output (PCM data output), and the Clock pin becomes the 512 kHz PCM data clock output (eight bit bursts at the 8 kHz frame rate). The B/D channel port provides the 8 kHz frame sync clock. The 64 kHz data clock must be synchronized to the 8 kHz frame sync.

The actually constructed PCM test port does not use the serial I/O port's transmit buffer, receive buffer, or clock generator. The audio path logic provides the clock and a serial transmit bit stream, and receives the receive data in serial form. In other words, the PCM test function uses the serial I/O port pins, but the logic to support clock generation, clock synchronization, serial to parallel, and parallel conversion is handled within the audio path logic.

System Control—Keypad Scanner

The actually constructed keypad scanner provides the ability to support keypads of up to 36 keys. This keypad scanner operates in two modes: 1) activity detect, and 2) normal.

In the activity detect mode, it is not necessary to determine which key is depressed, only that a key has been depressed. This allows the IC to wake up from shut-down mode when the user presses a key. An output is generated to the clock generator module 82 when activity is detected while the IC is in shut-down mode.

In normal mode, the identity of the depressed key is determined and reported. Debouncing is the responsibility of the user software. An interrupt is generated when activity is detected, e.g., when a key is closed. Typically, the user responds to the interrupt by masking the keypad interrupt, setting a microcontroller timer (debounce time is typically 4 to 16 milliseconds), and returning from the interrupt. When the timer expires an interrupt is generated. This causes the user to read a keypad status register, which at this time contains the stable identity of the depressed key. This status includes a no keys down code (00000000), a multiple keys down code (0XXXXXX1), and codes for each of the keys (0RRRCCC0); R=row code, C=column code, and X=don't care.

Figure 15:
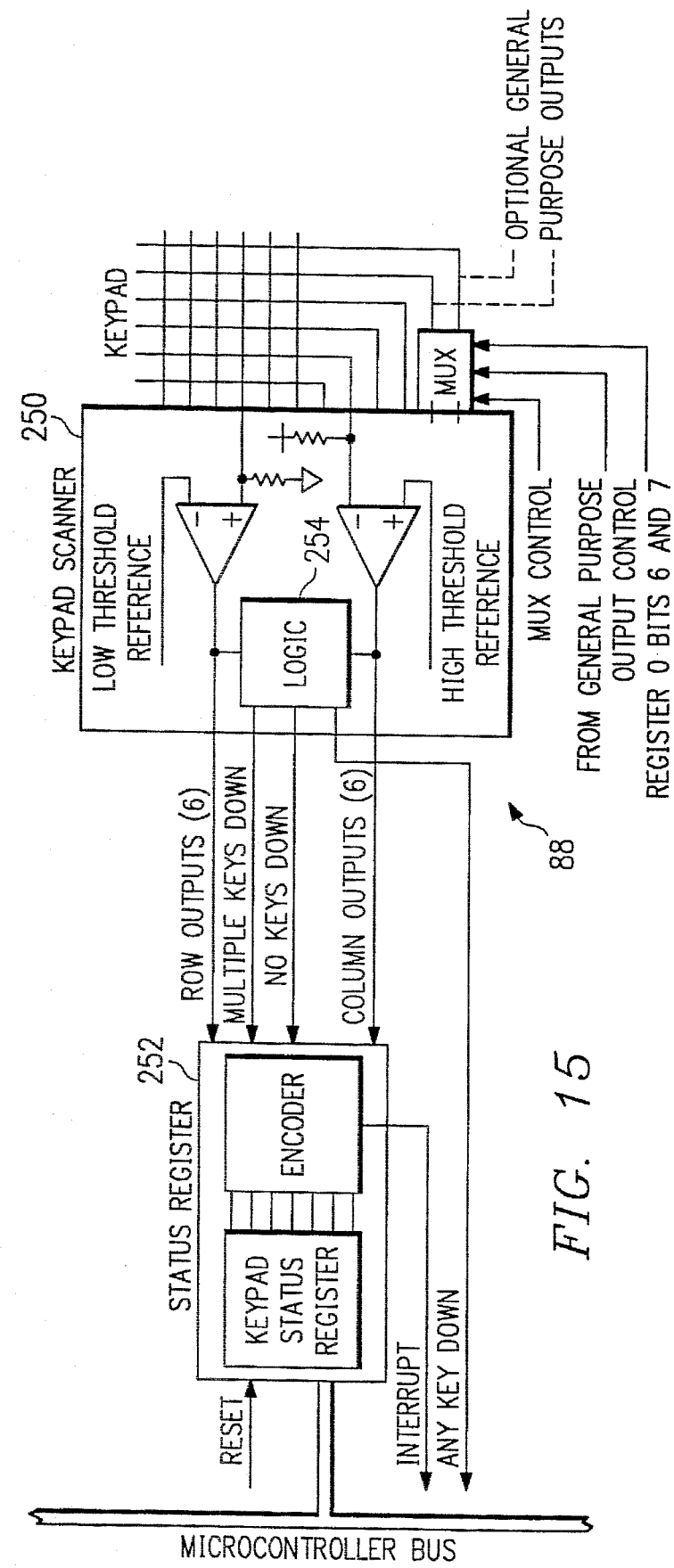
FIG. 15 is a block diagram of a keypad scanner that may form part of an IC according to the teachings of the present invention.

FIG. 15 shows a block diagram of the keypad scanner. The module is comprised of the scanner unit 250 and the keypad status register 252.

The scanner 250 contains row and column input pins and comparators, and a block of logic 254 that detects the no keys down, multiple keys down, and any key down conditions.

The status logic formats the inputs from the scanner, and presents this status to the user. More specifically, keypad status logic comprises the following:

| Inputs | 6 row comparator outputs |
| --- | --- |
|  | 6 column comparator outputs |
|  | No keys down output |
|  | Multiple keys down output |
|  | microcontroller Read strobe |
|  | microcontroller data bus |
|  | Register select strobe from address decoder module |
| Outputs | Register drives the internal data bus when accessed by the address decoder module. |
|  | An interrupt request is generated whenever the value of the register changes. This interrupt request is connected to interrupt controller. |
| Encoder | The six row and six column signals are encoded into two three-bit words (octal to binary encoding). This is combined with The no keys down and multiple keys down indications to form a seven-bit word. Bit 7 of the register is always 0. |

System Control—Real-Time Clock

A real-time clock is provided on the actually constructed IC. This clock 74 (see FIG. 3a) operates from the normal IC supply while the IC is powered on, and from a dedicated battery when the IC is powered down. A 32.768 kHz crystal is connected to the real-time clock. Additionally, a 1k byte block of RAM is provided. This "on-chip" RAM is independent from the real-time clock except that it is powered from the real-time clock's BATT IN pin.

Figure 16:
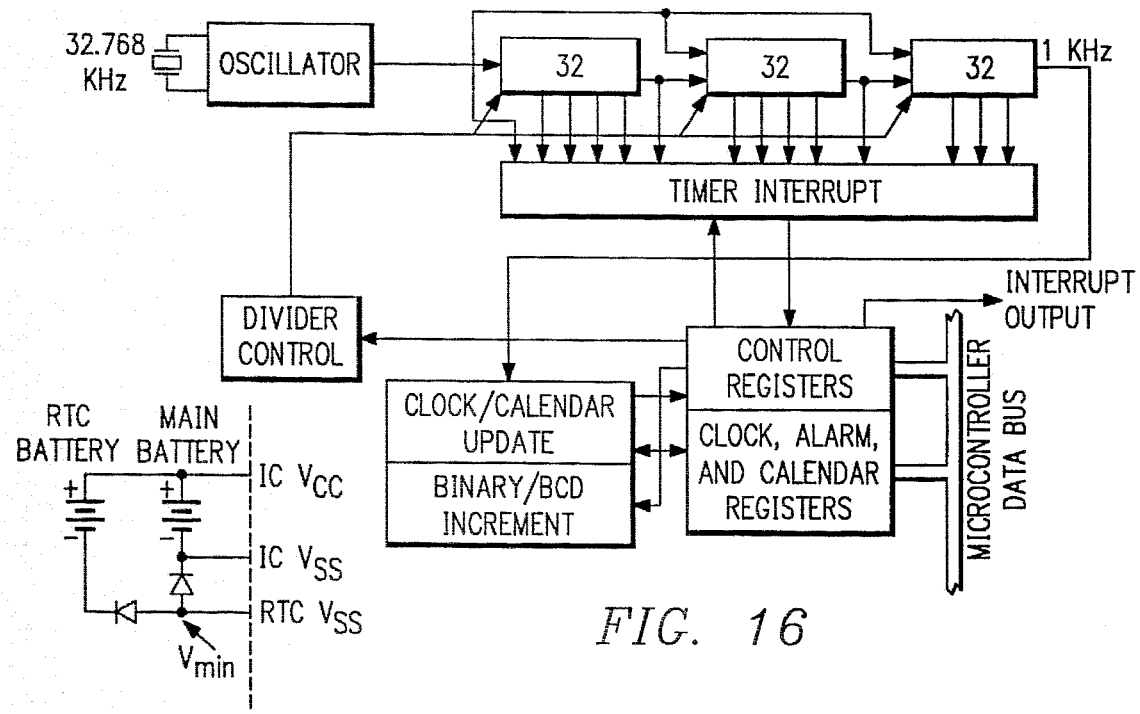
FIG. 16 is a block diagram of a real-time clock module that may form part of an IC according to the teachings of the present invention.

FIG. 16 show a block diagram of the actually constructed real-time clock module 74.

System Control—Battery Level Detector

The actually constructed IC includes a mechanism providing a digital representation of the power supply (i.e., battery) voltage level over a range of 2.7 to 5.5 volts.

Functionally, the battery voltage monitor circuit compares the voltage on a Vcc pin to an internal threshold voltage. If Vcc is above the threshold voltage, the comparator output is high. If Vcc is below the threshold, the comparator output is low. In the actually constructed embodiment of the present invention, the internal threshold voltage is programmable via a 4-bit code from 2.7 Volts to 5.4 Volts, with an accuracy of ±5%.

Figure 17:
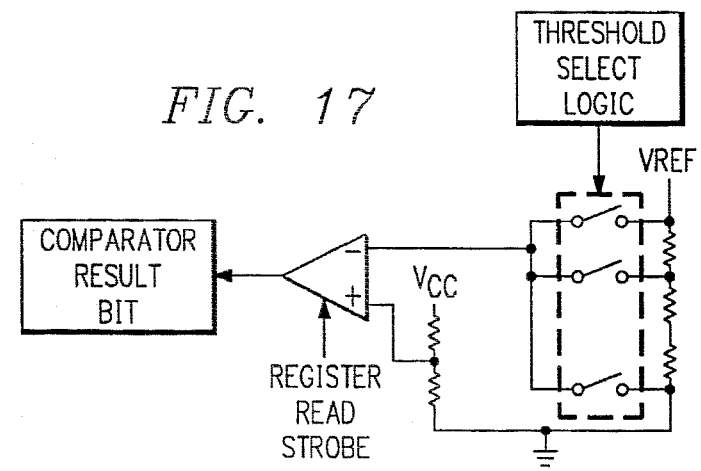
FIG. 17 is a block diagram of a battery level detector that may form part of an IC according to the teachings of the present invention.

FIG. 17 is a block diagram of the actually constructed battery level detector module.

CT2

The CT2 portion of the IC's according to the teachings of the present invention includes the following modules: FIFOs 90, a B/D Channel Port (see FIG. 3b), a transmit modem 100, an RSSI A/D Converter 92, and a logic module 96.

Figure 18:
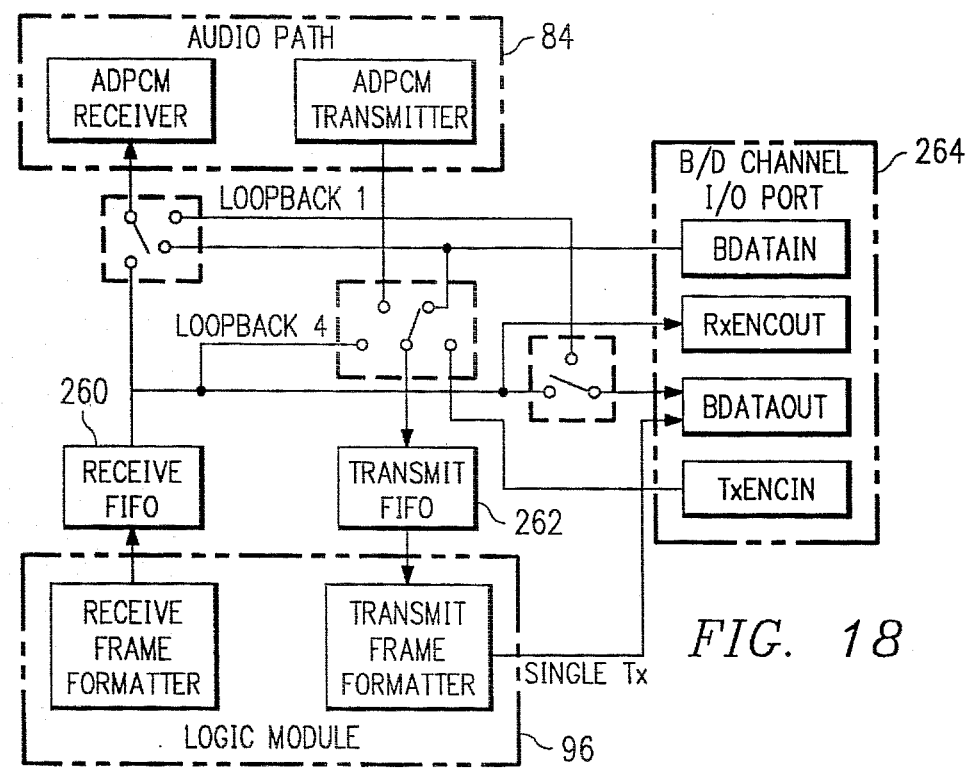
FIG. 18 shows various CT2 modules that may form part of an IC according to the teachings of the present invention.

In the actually constructed embodiment of the present invention, two unidirectional FIFOs 260, 262 are provided between the ADPCM block 84, the B channel I/O 264, and the frame formatter 96, with one in the transmit direction and one in the receive direction 262 (see FIG. 18). These FIFOs provide an elastic store between the 72 kbps radio burst rate and the constant 32 kbps ADPCM, B channel port rate. The FIFOs appear to be serial when viewed from the frame formatter 96, and 4 bits wide when viewed by the ADPCM block 84 because the ADPCM operates on nibbles.

The actually constructed FIFO module 90 builds 512 kHz, 32 kHz, and 8 kHz clocks from either a 1.152 MHz clock from the logic module 96, (specifically, a PLL1152) or a fixed 1.152 MHz clock from the clock generator module 82.

The actually constructed B/D Channel I/O Port module 264 provides six I/O pins that are multiplexed to serve four separate functions: a B channel I/O port, including encryption; a D channel I/O port; a single transmit (Tx Modulator I/O); and six general purpose output ports.

The transmit modulator 100 accepts serial data from the CT2 logic module 96 and converts it to a quadrature pair of single-ended analog outputs. The outputs generated in the actually constructed embodiment of the present invention are intended to be externally mixed with an IF carrier and summed to obtain the desired frequency modulated signal.

Figure 19:
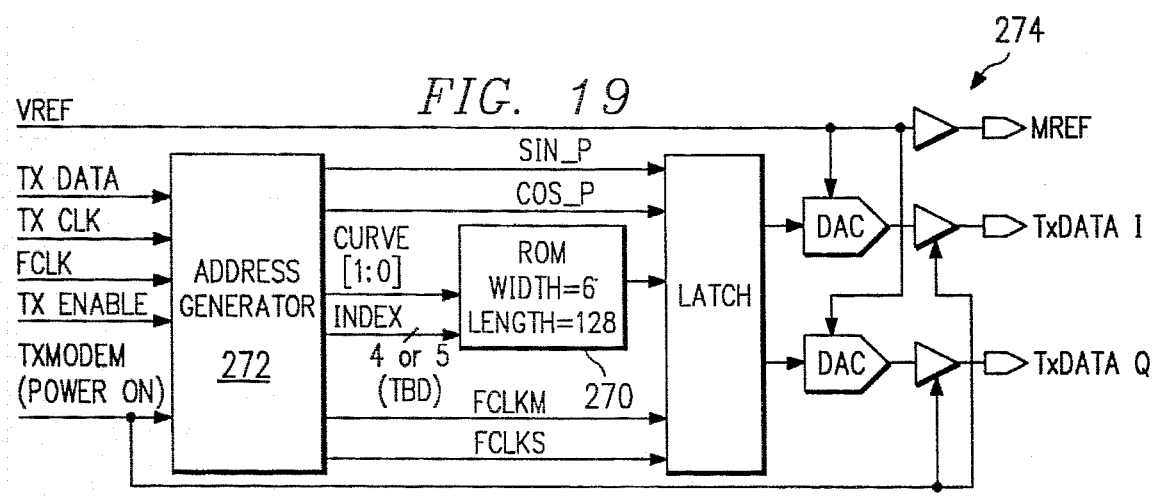
FIG. 19 is a block diagram of a transmit modulator that may form part of an IC according to the teachings of the present invention.

A block diagram of the modulator 100 is shown in FIG. 19. The heart of the modulator 100 is a look-up ROM 270 addressed by a data dependent state machine address generator 272 and followed by a series of synchronizing latches 274. Two identical 6-bit+sign DAC's followed by buffers drive the analog outputs.

As discussed in much greater detail in various of the related applications, a test mode is provided in embodiments of the present invention to simplify spectral measurements.

The receive signal strength indication (RSSI) module 92 provides a digital representation of the RF receive signal level. Functionally, current to voltage translation, input range, and microprocessor access of the RSSI A/D converter are noteworthy. With respect to current to voltage translation, an external FSK demodulator generates an analog signal that's current is proportional to the receive signal strength. This output current is terminated in an external resistor to translate it into a voltage. With respect to input range, the input range of the A/D converter is determined primarily by the common mode voltage swing of the input comparator. Finally, with regard to microprocessor access, to enable an A/D conversion, the A/D converter must be enabled (e.g., via a bit in a module enable control register in the clock generator module) and a conversion must be requested. Requests can be made via software.

Discussing now generally the logic module 96, a frame controller is provided which comprises a receive timing recovery, a frame timing generator, a SYNC channel handler, a B channel handler, a D channel handler, and a modem timing adjustment.

Figure 20:
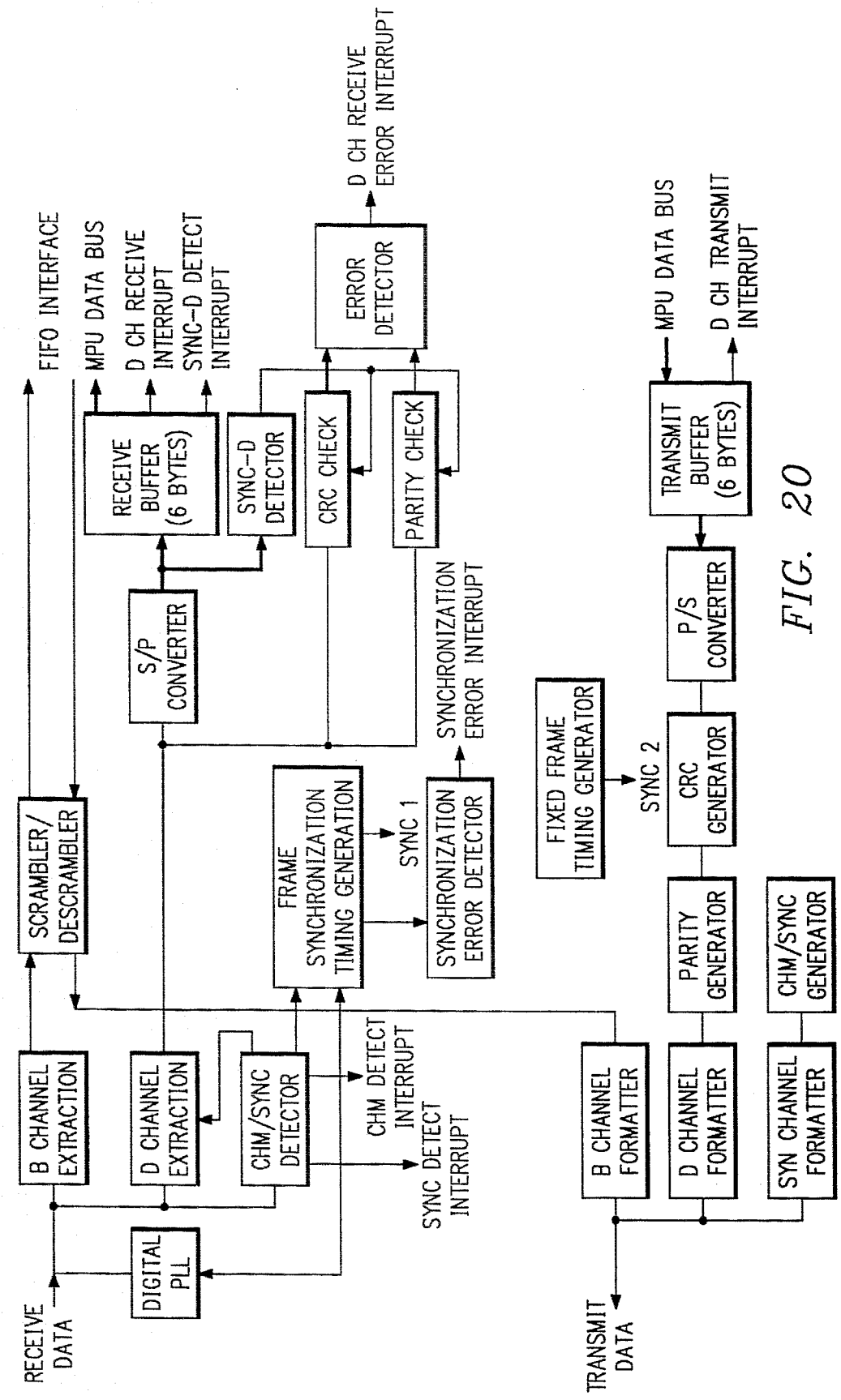
FIG. 20 is a block diagram of a frame controller that may form part of an IC according to the teachings of the present invention.

FIG. 20 is a block diagram of the frame controller, including the receive timing recovery, frame timing generator, SYNC channel handler, B channel handler, D channel handler.

With regard to the receive timing recovery function, bit synchronized timing from the receive data (Rx Data) is generated and fed to the various functions.

The SYN channel handler receives a burst signal and the PLLed clock from the receive clock generator (DPLL) and it gives received sync information to the frame timing generator and the CPU. It also receives transmit timing pulses from the frame timing generator, transmit data from the B channel handler and the D channel handler and it generates a transmit burst signal.

The frame timing generator receives received synchronization information from the syn channel handler when the system is receiving a signal, gives all the necessary receive and transmit timing pulses to the B channel handler, the D channel handler, the SYN channel handler of the transmit portions, MODEM timing adjustment, and any other blocks where those pulses are required.

The modem timing adjustment measures the delay of the modem and the RF section when they are transmitting and receiving a reference signal from the modem.

Based upon the foregoing, those skilled in the art should now fully understand and appreciate the improvements made by the teachings herein. Those skilled in the art should also fully understand and appreciate the value and merits of the IC's and cordless telephones described herein. On virtually every point made herein, however, further details may be found in the related cases listed in the cross-reference to related applications section above. Although those details are not necessary for those skilled in the art to practice the present invention or to comprehend its best mode of practice, those details may be useful to those skilled in the art and they may wish to refer to them.

Obviously, numerous modifications and variations are possible in light of the teachings herein. Accordingly, within the scope of the appended claims, the present invention may be practiced otherwise than as specifically described above.

What is claimed is:

1. An integrated circuit comprising:
  (a) an external interface portion, said external interface portion comprising:
    (i) means for operatively connecting an external keypad thereto;
    (ii) means for operatively connecting an external memory thereto;
    (iii) means for operatively connecting an external oscillator thereto;
    (iv) means for operatively connecting an external transceiver thereto;
    (v) a serial port;
    (vi) a parallel port; and
    (vii) an audio interface subportion;
  (b) an audio path portion, said audio path portion comprising:
    (i) a codec, said codec operatively connected to said audio interface subportion;
    (ii) an ADPCM, said ADPCM directly connected to said codec to define a codec/ADPCM element which is further directly connected to said serial port;
    (iii) a first and a second FIFO operatively connected to said ADPCM; and
    (iv) a tone ringer operatively connected to said audio interface subportion; and
  (c) a system control portion, said system control portion comprising:
    (i) a microcontroller directly connected to said parallel port;
    (ii) a frame formatter operatively connected to said microcontroller;
    (iii) a battery level detector;
    (iv) a RSSI A/D converter;
    (v) a real time clock;
    (vii) means for scanning a keypad connected to said means for operatively connecting an external keypad thereto;
    (viii) an interrupt controller, said interrupt controller operatively connected between said microcontroller and said means for scanning a keypad; and (ix) a clock generator, said clock generator connected between said microcontroller and said means for operatively connecting an external audio path portion thereto.

2. An integrated circuit as recited in claim 1, further comprising means for stopping said clock generator to thereby place said integrated circuit into a shut-down mode.

3. An integrated circuit as recited in claim 1, further comprising means for disabling said microcontroller, and means for enabling an external emulator to function for said microcontroller when it is disabled.

4. An integrated circuit as recited in claim 1, wherein said means for scanning a keypad further comprises a keypad status register with a content changeable by keypad activity, means for generating an interrupt when the content of said keypad status register is changed, and means, responsive to an interrupt, for reading said keypad status register a predetermined period of time after said interrupt, to determine whether multiple keys are depressed or if a single key is depressed and released.

5. An integrated circuit as recited in claim 1, further comprising means for detecting single bit errors in a signal, said means for detecting single bit errors generating a stream of pulses, and means for averaging said stream of pulses.

6. An integrated circuit as recited in claim 5, further comprising means for attenuating said signal a predetermined amount in the event of a detected error, and means for stepping said signal back up a predetermined amount in the even of passage of a predetermined amount of time with no error.

7. An integrated circuit as recited in claim 1, wherein said serial port comprises a receiver, a transmitter, a clock generator, and means for starting and stopping said clock generator.

8. An integrated circuit as recited in claim 1, wherein said microcontroller has at least one port pin, and further comprising means for causing said at least one port pin to generate interrupts to said microcontroller, said means for causing comprising a first set of interrupt masks operatively associated with said at least one port pin to configure it, and a second set of interrupt masks to selectively hold off interrupts.

9. An integrated circuit as recited in claim 1, further comprising means for verifying the spectral content of a transmitted output.

10. An integrated circuit as recited in claim 1, wherein said microcontroller has at least one output buffer with a weak pull up, and further comprising means for disabling said pull up.

11. A cordless telephone comprising:
a base unit connectable to a telephone network line for receiving and transmitting signals therethrough;
a handset unit selectively mountable upon and separable from said base unit; separable from said base unit;
said base and handset units including respective means for the transmission and reception of signals there between over electromagnetic waves; and
said base and handset units each including an individual substantially identical, each of said integrated circuit including:
a microcontroller;
an audio interface controlled by said microcontroller;
an ADPCM (adaptive differential pulse code modulator) connected to said audio interface;
a communication logic portion connected to said ADPCM and to at least one of a data transmit line and a data receive line,
said integrated circuit having a plurality of modes of operation including at least one of an in-circuit emulation mode, a normal mode, and a test mode;
clock register means operatively associated with said integrated circuit;
access control register means and
means for controlling the stoppage of a clock signal to said microcontroller, responsive to the writing of information to at least both said access control register means and said clock register means.

12. A cordless telephone as recited in claim 11, wherein said base and handset units further include respective oscillators operatively connected to their respective microcontrollers, and still further include respective means for stopping and restarting said respective oscillators.

13. A cordless telephone as recited in claim 11, wherein said base and handset units further include means for disabling their respective microcontrollers, and means for enabling external microcontrollers to function for their respective microcontrollers when they are disabled.

14. A cordless telephone as recited in claim 11, wherein each of said individual, substantially identical, integrated circuits comprises;
an external interface portion, said external interface portion comprising:
(i) means for operatively connecting an external keypad thereto;
(ii) means for operatively connecting an external memory thereto;
(iii) means for operatively connecting an external oscillator thereto;
(iv) means for operatively connecting an external transceiver thereto;
(v) a serial port;
(vi) a parallel port; and
(vii) an audio interface subportion;
(b) an audio path portion, said audio path portion comprising:
(i) a codec, said codec operatively connected to said audio interface subportion;
(ii) an ADPCM, said ADPCM directly connected to said codec to define a codec/ADPCM element which is further directly connected to said serial port; and
(iv) a tone ringer, said tone ringer operatively connected to said audio interface subportion; and
(c) a system control portion, said system control portion comprising:
(i) a microcontroller directly connected to said parallel port;
(ii) means for scanning a keypad connected to said means for operatively connecting an external keypad thereto;
(iii) an interrupt controller, said interrupt controller operatively connected between said microcontroller and said means for scanning a keypad; and
(iv) a clock generator, said clock generator connected between said microcontroller and said means for operatively connecting an external audio path portion thereto.

15. An integrated circuit comprising:
(a) a system control portion including:
a microcontroller;
means for formatting data and sending said data to said microcontroller;
an RSSI A/D converter connected to said means for formatting; and means for providing timing signals connected to at least said means for formatting;
(b) an external interface portion connected to said microcontroller, including:
means for operatively connecting an external keypad thereto; and
means for operatively connecting an external transceiver thereto;
(c) a serial port;
(d) a parallel port; and
(e) an audio path portion including:
an audio interface;
a codec operatively connected to said audio interface;
an ADPCM connected to both said codec and said serial port; and
means for passing data to said ADPCM.

16. A cordless telephone comprising:
a base unit connectable to a telephone network line for receiving and transmitting signals therethrough;
a handset unit selectively mountable upon and separable from said base unit;
said base and handset units including respective means for the transmission and reception of signals there between over electromagnetic waves; and
said base and handset units each including an individual substantially identical, each of said integrated circuit including:
a microcontroller;
an audio interface controlled by said microcontroller;
an ADPCM (adaptive differential pulse code modulator) connected to said audio interface;
a communication logic portion connected to said ADPCM and to at least one of a data transmit line and a data receive line,
said integrated circuit having a plurality of modes of operation including at least one of an in-circuit emulation mode, a normal mode, and a test mode;
wherein said microcontroller is coupled to a means for formatting data and sending said data to said microcontroller;and
an RSSI A/D converter connected to the means for formatting.

17. An IC (integrated circuit) comprising:
an audio interface;
an ADPCM (adaptive differential pulse code modulator) module connected to said audio interface;
a communication logic portion connected to said ADPCM module and to at least one of a data transmit line and a data receive line;
a microcontroller which controls said audio interface, said ADPCM module and said communication logic portion;
a plurality of I/O ports (input/output ports), wherein a plurality of said I/O ports, have pull-ups capable of being disabled in order to conserve electrical energy consumption of said IC, said pull-ups being controlled by said microcontroller; and
wherein said microcontroller is coupled to a means for formatting data and sending said data to said microcontroller;and
an RSSI A/D converter connected to the means for formatting.

* * * * *

UNITED STATES PATENT AND TRADEMARK OFFICE
CERTIFICATE OF CORRECTION

PATENT NO.  : 5,555,287
DATED       : Sep. 10, 1996
INVENTOR(S) : Gulick et al.

It is certified that error appears in the above-indentified patent and that said Letters Patent is hereby corrected as shown below:

| | |
|---|---|
| Column 8, line 5 | Replace "des tribe" With --describe-- |
| Column 15, line 15 | Replace "PO.7-PC.0" With --PO.7-PO.0-- |
| Column 20, line 28 | Replace "1192" With --1 192-- |
| Column 21, line 25 | Delete "35" |
| Column 25, line 13 | Replace "PLLI152" With --PLL1152-- |
| Column 27, lines 52-53 | Delete second occurrence of "separable from said base unit;" |

Signed and Sealed this

Fifteenth Day of July, 1997

Attest:

BRUCE LEHMAN

Attesting Officer

Commissioner of Patents and Trademarks